United States Patent
Khoryaev et al.

(10) Patent No.: US 11,026,120 B2
(45) Date of Patent: Jun. 1, 2021

(54) PARTIAL SENSING AND CONGESTION CONTROL FOR LONG TERM EVOLUTION (LTE) VEHICULAR COMMUNICATION

(71) Applicant: Apple Inc., Cupertino, CA (US)

(72) Inventors: Alexey Khoryaev, Nizhny Novgorod (RU); Sergey Panteleev, Nizhny Novgorod (RU); Mikhail S. Shilov, Nizhny Novgorod (RU); Sergey D. Sosin, Zavolzhie (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/476,128

(22) PCT Filed: Feb. 6, 2018

(86) PCT No.: PCT/US2018/017000
§ 371 (c)(1),
(2) Date: Jul. 5, 2019

(87) PCT Pub. No.: WO2018/145067
PCT Pub. Date: Aug. 9, 2018

(65) Prior Publication Data
US 2020/0029245 A1     Jan. 23, 2020

Related U.S. Application Data

(60) Provisional application No. 62/455,420, filed on Feb. 6, 2017.

(51) Int. Cl.
*H04W 28/08* (2009.01)
*H04B 17/318* (2015.01)
(Continued)

(52) U.S. Cl.
CPC .......... *H04W 28/08* (2013.01); *H04B 17/318* (2015.01); *H04L 5/0042* (2013.01);
(Continued)

(58) Field of Classification Search
CPC ...... H04B 17/318; H04L 5/0042; H04W 4/40; H04W 4/46; H04W 28/08;
(Continued)

(56) References Cited

U.S. PATENT DOCUMENTS 10,257,747 B2 * 4/2019 Kim .................. H04W 80/02
10,257,748 B2 * 4/2019 Kim .................. H04W 72/0406
(Continued)

FOREIGN PATENT DOCUMENTS

EP       3554128 A4 * 1/2020 ........ H04W 72/0446

OTHER PUBLICATIONS

Spreadtrum Communications, Discussion on resource sensing and selection for pedestrian UEs, Oct. 10, 2016, 3GPP, 3GPP TSG RAN WG1 meeting #86bis, Tdoc: R1-1608911 (Year: 2016).*
(Continued)

*Primary Examiner* — Eric Nowlin
(74) *Attorney, Agent, or Firm* — Eschweiler & Potashnik, LLC

(57) ABSTRACT

A user equipment (UE) or network device such a vehicle UE (V-UE) or pedestrian UE (P-UE) can configure resources independently for communication with other V-UEs/P-UEs to avoid collision and ensure safety. The UEs can operate to independently monitor and configure their own resources via partial sensing window configurations that can dynamically configured to perform resource (re)selection in response to a resource reselection trigger. An exclusion of detected resources that are reduced or occupied by other devices can be performed, and a resource candidate set generated to select resource candidates for long term evolution (LTE) vehicular communications. UE partial sensing mechanisms and congestion control can be enhanced for these commu-
(Continued)

nications via efficient power control and signaling reliance for vehicle communication quality, as well as pedestrian safety.

23 Claims, 14 Drawing Sheets

(51) Int. Cl.
| | |
|---|---|
| *H04W 4/46* | (2018.01) |
| *H04W 76/23* | (2018.01) |
| *H04L 5/00* | (2006.01) |
| *H04W 28/02* | (2009.01) |
| *H04W 36/06* | (2009.01) |
| *H04W 36/22* | (2009.01) |
| *H04W 72/04* | (2009.01) |
| *H04W 72/08* | (2009.01) |

(52) U.S. Cl.
CPC ......... *H04W 4/46* (2018.02); *H04W 28/0284* (2013.01); *H04W 36/06* (2013.01); *H04W 36/22* (2013.01); *H04W 72/0486* (2013.01); *H04W 72/082* (2013.01); *H04W 76/23* (2018.02)

(58) Field of Classification Search
CPC . H04W 28/0284; H04W 28/26; H04W 36/06; H04W 36/22; H04W 72/02; H04W 72/0486; H04W 72/082; H04W 76/23; H04W 76/28
See application file for complete search history.

(56) References Cited

U.S. PATENT DOCUMENTS

| | | | |
|---|---|---|---|
| 10,327,173 B1* | 6/2019 | Kim | H04W 28/065 |
| 10,383,147 B2* | 8/2019 | Rajagopal | H04W 28/0284 |
| 10,412,629 B2* | 9/2019 | Kim | H04W 72/0406 |
| 10,419,973 B2* | 9/2019 | Kim | H04W 72/0406 |
| 10,425,916 B2* | 9/2019 | Lee | H04W 72/005 |
| 10,531,333 B1* | 1/2020 | Kim | H04W 80/02 |
| 10,616,842 B2* | 4/2020 | Lee | H04W 92/18 |
| 10,631,205 B2* | 4/2020 | Kim | H04W 28/065 |
| 10,667,176 B2* | 5/2020 | Kim | H04W 72/0406 |
| 10,701,691 B2* | 6/2020 | Li | H04W 72/02 |
| 10,772,075 B2* | 9/2020 | Lee | H04W 72/005 |
| 10,893,563 B2* | 1/2021 | Li | H04W 72/0446 |
| 2017/0188391 A1* | 6/2017 | Rajagopal | H04W 74/0816 |
| 2017/0201461 A1* | 7/2017 | Cheng | H04L 47/286 |
| 2018/0146398 A1* | 5/2018 | Kim | H04W 80/02 |
| 2018/0146467 A1* | 5/2018 | Kim | H04W 28/065 |
| 2018/0332564 A1* | 11/2018 | Lee | H04W 4/40 |
| 2018/0338300 A1* | 11/2018 | Lee | H04W 72/02 |
| 2019/0045465 A1* | 2/2019 | Lee | H04W 56/00 |
| 2019/0182840 A1* | 6/2019 | Feng | H04W 4/44 |
| 2019/0200260 A1* | 6/2019 | Kim | H04W 28/065 |
| 2019/0200261 A1* | 6/2019 | Kim | H04W 72/0406 |
| 2019/0200262 A1* | 6/2019 | Kim | H04W 80/02 |
| 2019/0313405 A1* | 10/2019 | Li | H04W 72/0446 |
| 2020/0008098 A1* | 1/2020 | Kim | H04W 80/02 |
| 2020/0008183 A1* | 1/2020 | Chen | H04W 72/0406 |
| 2020/0008258 A1* | 1/2020 | Li | H04W 24/10 |
| 2020/0029245 A1* | 1/2020 | Khoryaev | H04W 4/46 |
| 2020/0036422 A1* | 1/2020 | Li | H04B 7/0617 |
| 2020/0037358 A1* | 1/2020 | Chae | H04W 74/0808 |
| 2020/0045715 A1* | 2/2020 | Li | H04W 72/1263 |
| 2020/0068438 A1* | 2/2020 | Kim | H04W 80/02 |
| 2020/0077301 A1* | 3/2020 | Kim | H04W 28/065 |
| 2020/0100215 A1* | 3/2020 | Li | H04L 5/0094 |
| 2020/0112982 A1* | 4/2020 | Li | H04L 5/0082 |
| 2020/0213961 A1* | 7/2020 | Lee | H04W 56/001 |
| 2020/0288347 A1* | 9/2020 | Kim | H04W 72/0406 |
| 2020/0344722 A1* | 10/2020 | He | H04W 72/0446 |

OTHER PUBLICATIONS

Sony, Discussion on detail of partial sensing for pedestrian UEs, Oct. 10, 2016, 3GPP, 3GPP TSG RAN WG1 meeting #86bis, Tdoc: R1-1608947 (Year: 2016).*
Samsung, Partial sensing for pedestrian UE, Oct. 10, 2016, 3GPP, 3GPP TSG RAN WG1 meeting #86bis, Tdoc: R1-1608989 (Year: 2016).*
LG Electronics, Discussion on partial sensing for P-UEs, Oct. 10, 2016, 3GPP, 3GPP TSG RAN WG1 meeting #86bis, Tdoc: R1-1609184 (Year: 2016).*
Intel Corporation, Partial sensing for P2V communication, Oct. 10, 2016, 3GPP, 3GPP TSG RAN WG1 meeting #86bis, Tdoc: R1-1609457 (Year: 2016).*
Xinwei, Discussion on partial sensing of pedestrian UEs, Oct. 10, 2016, 3GPP, 3GPP TSG RAN WG1 Meeting #86bis, Tdoc: R1-1609681 (Year: 2016).*
Ericsson, Partial sensing for V2P, Oct. 10, 2016, 3GPP, 3GPP TSG RAN WG1 Meeting #86bis, Tdoc: R1-1609724 (Year: 2016).*
ZTE, Details of resource selection using partial sensing by P-UEs, Oct. 10, 2016, 3GPP, 3GPP TSG RAN WG1 Meeting #86bis, Tdoc: R1-1609806 (Year: 2016).*
Sharp, Further Discussions on Power Efficient Sensing for P-UEs, Oct. 10, 2016, 3GPP, 3GPP TSG RAN WG1 Meeting #86bis, Tdoc: R1-1609866 (Year: 2016).*
Qualcomm Incorporated, Sensing based resource selection for V2P, Oct. 10, 2016, 3GPP, 3GPP TSG-RAN WG1 #86bis, Tdoc: R1-1609957 (Year: 2016).*
NTT DOCOMO, Inc., Discussion on details of pedestrian UE partial sensing, Oct. 10, 2016, 3GPP, 3GPP TSG-RAN WG1 #86bis, Tdoc: R1-1610035 (Year: 2016).*
Huawei et al., WF on P-UE sensing timeline in partial sensing, Oct. 10, 2016, 3GPP, 3GPP TSG-RAN WG1 #86bis, Tdoc: R1-1610739 (Year: 2016).*
Huawei et al., WF on P-UE sensing timeline in partial sensing, Oct. 10, 2016, 3GPP, 3GPP TSG RAN WG1 Meeting #86b, Tdoc: R1-1611016 (Year: 2016).*
Huawei et al., Discussion on reselection counter in sensing, Nov. 14, 2016, 3GPP, 3GPP TSG RAN WG1 Meeting #87, Tdoc: R1-1611130 (Year: 2016).*
Huawei et al., Evaluation results for P-UE partial sensing, Nov. 14, 2016, 3GPP, 3GPP TSG RAN WG1 Meeting #87, Tdoc: R1-1611136 (Year: 2016).*
Huawei et al., Procedure for P-UE partial sensing, Nov. 14, 2016, 3GPP, 3GPP TSG RAN WG1 Meeting #87, Tdoc: R1-1611192 (Year: 2016).*
Sequans Communications, Partial sensing for pedestrian UEs, Nov. 14, 2016, 3GPP, 3GPP TSG RAN WG1 Meeting #87, Tdoc: R1-1611266 (Year: 2016).*
Qualcomm Incorporated, Sensing based resource selection for V2P, Nov. 14, 2016, 3GPP, 3GPP TSG RAN WG1 Meeting #87, Tdoc: R1-1611592 (Year: 2016).*
LG Electronics, Details of partial sensing for P-UE resource selection, Nov. 14, 2016, 3GPP, 3GPP TSG RAN WG1 Meeting #87, Tdoc: R1-1611738 (Year: 2016).*
Intel Corporation, Partial sensing for P2V communication, Nov. 14, 2016, 3GPP, 3GPP TSG RAN WG1 Meeting #87, Tdoc: R1-1611923 (Year: 2016).*
Xinwei, Discussion on partial sensing of pedestrian UEs, Nov. 14, 2016, 3GPP, 3GPP TSG RAN WG1 Meeting #87, Tdoc: R1-1612233 (Year: 2016).*
Samsung, Partial sensing for pedestrian UE, Nov. 14, 2016, 3GPP, 3GPP TSG RAN WG1 Meeting #87, Tdoc: R1-1612391 (Year: 2016).*
NTT DOCOMO, Inc., Details of resource selection using partial sensing by pedestrian UE, Nov. 14, 2016, 3GPP, 3GPP TSG RAN WG1 Meeting #87, Tdoc: R1-1612687 (Year: 2016).*
Nokia et al., On random resource selection for V2P communication, Nov. 14, 2016, 3GPP, 3GPP TSG RAN WG1 Meeting #87, Tdoc: R1-1612881 (Year: 2016).*
Samsung et al., WF on partial sensing, Nov. 14, 2016, 3GPP, 3GPP TSG RAN WG1 Meeting #87, Tdoc: R1-1613279 (Year: 2016).*

(56) References Cited

OTHER PUBLICATIONS

Samsung et al., WF on partial sensing, Nov. 14, 2016, 3GPP, 3GPP TSG RAN WG1 Meeting #87, Tdoc: R1-1613465 (Year: 2016).*
LG Electronics et al., WF on sensing, Nov. 14, 2016, 3GPP, 3GPP TSG RAN WG1 Meeting #87, Tdoc: R1-1613472 (Year: 2016).*
Huawei et al., WF on P-UE sensing timeline in partial sensing, Nov. 14, 2016, 3GPP, 3GPP TSG RAN WG1 Meeting #87, Tdoc: R1-1613604 (Year: 2016).*
Huawei et al.,WF on P-UE resource selection in partial sensing ,Nov. 14, 2016, 3GPP, 3GPP TSG RAN WG1 Meeting #87, Tdoc: R1-1613604 (Year: 2016).*
Jeon et al., . Reducing Message Collisions in Sensing-Based Semi-Persistent Scheduling (SPS) by Using Reselection Lookaheads in Cellular V2X, Nov. 2018, Sensors, vol. 18, Issue 12, https://doi.org/10.3390/s18124388 (Year: 2018).*
Jung et al., Reducing Consecutive Collisions in Sensing Based Semi Persistent Scheduling for Cellular-V2X, Sep. 25, 2019, 2019 IEEE 90th Vehicular Technology Conference (VTC2019-Fall), pp. 1-5, doi: 10.1109/VTCFall.2019.8891226 (Year: 2019).*
International Preliminary Report on Patentability dated Aug. 16, 2019 for International Application No. PCT/US2018/017000.
International Search Report dated Apr. 19, 2018 for International Application No. PCT/US2018/017000.
3GPP TSG RAN WG1 Meeting #84; Intel Corporation; Sensing based collision avoidance schemes for V2V communication; St Julian's, Malta, Feb. 15-19, 2016.
3GPP TSG RAN WG1 #87; Samsung; Partial Sensing for Pedestrian UE; Reno, USA; Nov. 14-18, 2016.
3GPP TSG RAN WG1 Meeting #86bis; Huawei, HiSilicon; Discussion on the P-US Resource Selection; Libson, Portugal; Oct. 10-14, 2016.
3GPP TSG RAN WG1 Meeting #86bis; Intel Corportation; Partial Sensing for P2V Communication; Reno, USA; Nov. 14-18, 2016.

\* cited by examiner

PARTIAL SENSING AND CONGESTION CONTROL FOR LONG TERM EVOLUTION (LTE) VEHICULAR COMMUNICATION

REFERENCE TO RELATED APPLICATIONS

This application is a National Phase entry application of International Patent Application No. PCT/US2018/017000 filed Feb. 6, 2018, which claims priority to U.S. Provisional Application No. 62/455,420 filed Feb. 6, 2017, entitled "METHOD OF PARTIAL SENSING AND CONGESTION CONTROL FOR LTE" in the name of Alexey Khoryaev et al. and is hereby incorporated by reference in its entirety.

FIELD

The present disclosure relates to wireless technology, and more specifically to techniques for partial sensing and congestion control for long term evolution (LTE) vehicular communication.

BACKGROUND

Mobile communication, including cellular communication, involves the transfer of data between mobile devices. A type of mobile communication includes vehicle communication, where vehicles communicate or exchange vehicle related information. The vehicle communication can include vehicle to everything (V2X), which includes vehicle to vehicle (V2V), vehicle to infrastructure (V2I) and vehicle to pedestrian (V2P).

In some situations, vehicle related information is intended for a single vehicle or other entity. In other situations, such as emergency alerts, vehicle related information is intended for a large number of vehicles and/or other entities. The emergency alerts can include collision warnings, control loss warnings, and the like.

V2P communication and enabled with this communication applications provide an ever increasing potential benefit for safety between vehicles and pedestrian devices, which can include one or more of: bicyclist, children being pushed in baby carriages/strollers, walkers, joggers, people embarking on trains and busses, drivers, passengers, or more with a mobile device. V2P communications can ensure that a vehicle with adequate safety components and applications and the pedestrian user equipment (P-UE) are aware of one another sufficiently to avoid a collision.

A suitable technique to provide vehicle related information to multiple vehicles and/or other entities is needed for increased and ongoing safety.

DETAILED DESCRIPTION

Figure 1:
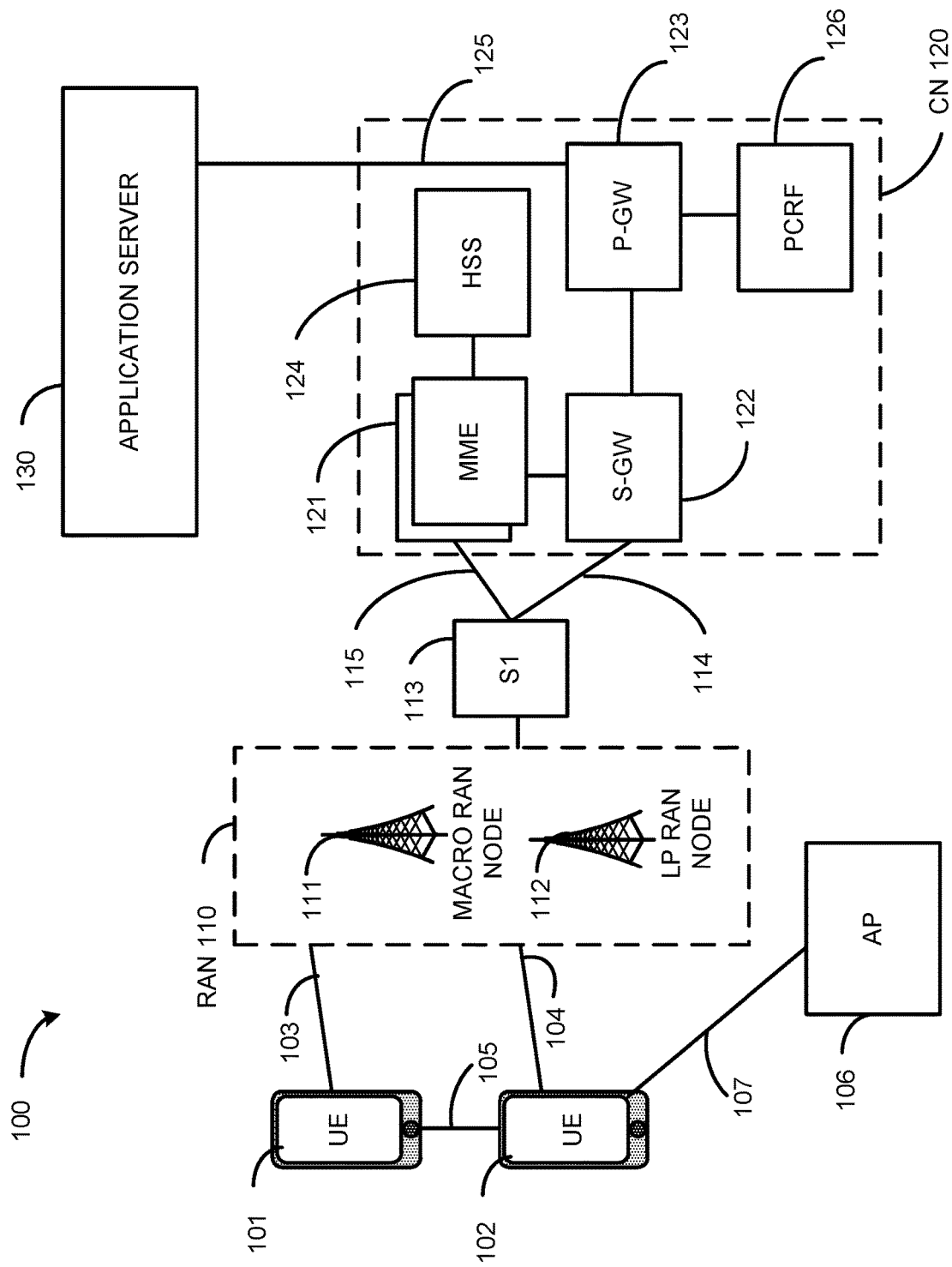
FIG. 1 is a block diagram illustrating an example user equipments (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, such as partial sensing to enable pedestrian-to-vehicle/vehicle-to-pedestrian (V2P) communication based on LTE sensing procedure(s) for vehicle-to-pedestrian (V2P) communication. Aspects/embodiments enable more power efficiencies in the sensing procedure and lower impacts on the V2V performance, such as by enabling resource selection details for P2V (V2P) communication based on partial sensing approaches and alongside corresponding agreements in 3GPP.

The main purpose of the partial sensing for the P-UE is to perform sensing with reduced power consumption. The power consumption of the UE can be directly linked to the duration of the sensing, therefore reducing the sensing duration (i.e. doing partial sensing), can be essential for power saving. However, if the sensing duration is extremely reduced, the system performance can degrade. One simple example, which dramatically reduces the power consumption of the UE, would be: perform sensing over a set of subframes for a duration of T milliseconds (ms) (e.g., T=10) which can be about 100 ms before the (re)selection window in which the transmission should occur. This allows the P-UE to reduce the power consumed by sensing operation by factor of 1000/T relative to the full sensing operation or full sensing window with a partial sensing window. However, this partial sensing allows the P-UE to avoid selecting resources which are reserved only by transmissions with 100 ms periodicity, and not necessarily always be able to detect any reserved resource(s) (e.g., control channel elements (CCEs) or CCE candidates, subframes, bandwidth, frequency, transmission opportunity, number of antenna ports, orthogonal frequency division symbols, or the like) with higher periodicity, i.e. 200-1000 ms which could share the same selection window as the P-UE, and, as a result, the packet reception rate (PRR) performance can degrade due to resource collisions between other different UEs or vehicle UEs utilizing these resources on the spectrum/medium of LTE vehicle communications.

Example agreements that could be standardized with 3GPP include, for example, that the P-UE performing partial sensing or random selection does not transmit a sidelink synchronization signal (SLSS) (e.g., a primary synchronization signal or secondary synchronization signal)/physical sidelink broadcast channel (PSBCH). (Pre)configuration instructs whether a P-UE uses partial sensing only, random selection only, or either of the two, in which P-UE partial sensing is described above and random selection refers to the random selection of resources with respect to sensed resource reservation intervals of surrounding/neighbor UEs or network devices.

In particular, when a P-UE is instructed to use partial sensing only, it can be undecided whether there is any case where the P-UE uses random selection, such as whether support of partial sensing is decided solely by the UE capability, the P-UE supports/does not necessarily support a resource reservation interval shorter than 100 milliseconds (ms), and when the P-UE makes resource selection/reselection decision at Transmission Time Interval (TTI) (m), the possible candidates resources, i.e., Y subframes, can be selected in a range [m+T1, m+T2] subframes, m being the TTI and one or more subframes, for example. The minimum value of Y can be (pre)configured, and the selection of Y subframes can depend on the P-UE implementation. For any candidate resource in subframe (n) within the set of Y subframes, the P-UE can sense at least subframe n−100*k, where the set of k can be (pre)configured with each element in the range of [1, 10] (or 1 to 10), for example.

The P-UE sensing behavior can be also undetermined by standard as well when a short transmission period (e.g., of about 20 ms, 50 ms, or less than 100 ms, or the other short transmission period) can be supported in the transmission (Tx) pool of the P-UE and when the P-UE starts sensing, for example.

In other aspects/embodiments, the UE behavior can be utilized with respect to congestion control when the UE or P-UE multiplexes Media Access Control (MAC) layer packet data units (PDUs) with different priority levels, for example, to enable pedestrian to vehicle (P2V) communication based on LTE sensing procedure designed for vehicular-to-vehicular (V2V) communication or corresponding to V2V protocols.

In aspects or embodiments, mechanisms/components/process(es)/operations can relate to resource (re)selection for P2V/V2P communication based on partial sensing to design power efficient sensing procedures with minimal impact on V2V communication performances and factoring in traffic congestion.

Additional aspects and details of the disclosure further described below with reference to figures.

Embodiments described herein can be implemented into a system using any suitably configured hardware and/or software. FIG. 1 illustrates an architecture of a system 100 of a network in accordance with some embodiments. The system 100 is shown to include a user equipment (UE) 101 and a UE 102, which can further represent pedestrian UE devices (P-UEs), which can include one or more of: bicyclist, children being pushed in baby carriages/strollers, walkers, joggers, people embarking on trains and busses, drivers, passengers, or more, with a mobile device or UE. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH)

can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDCCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
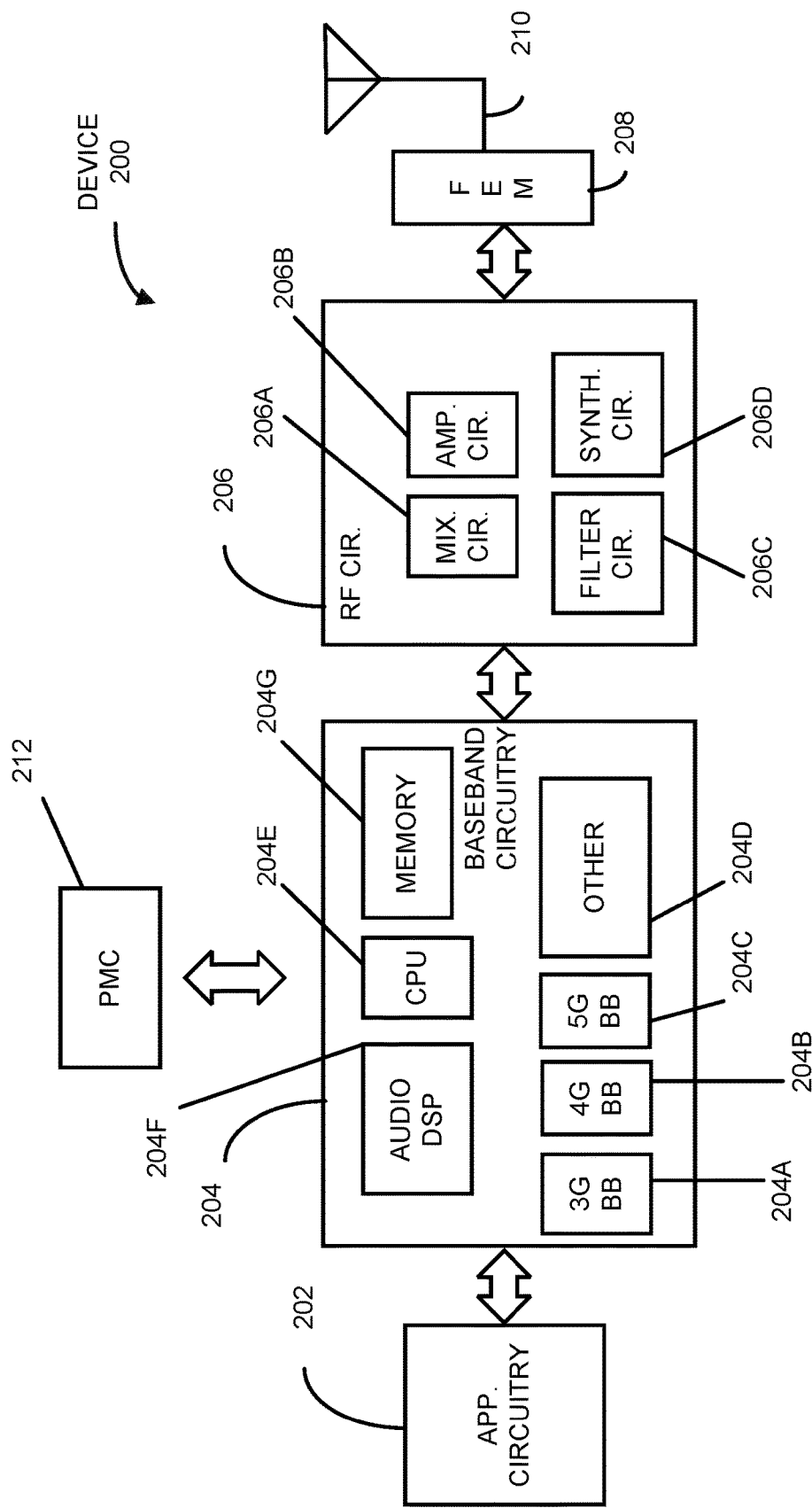
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
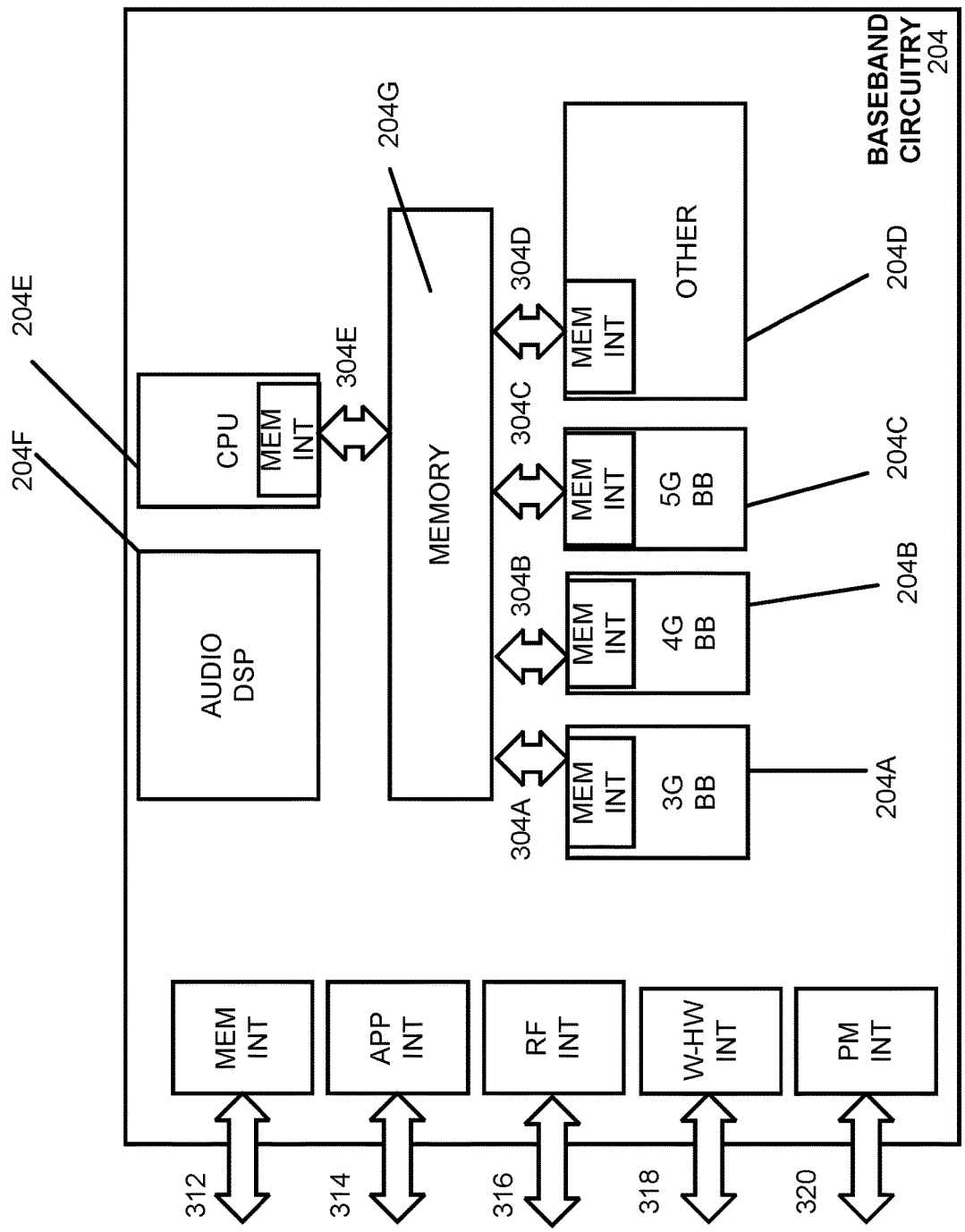
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
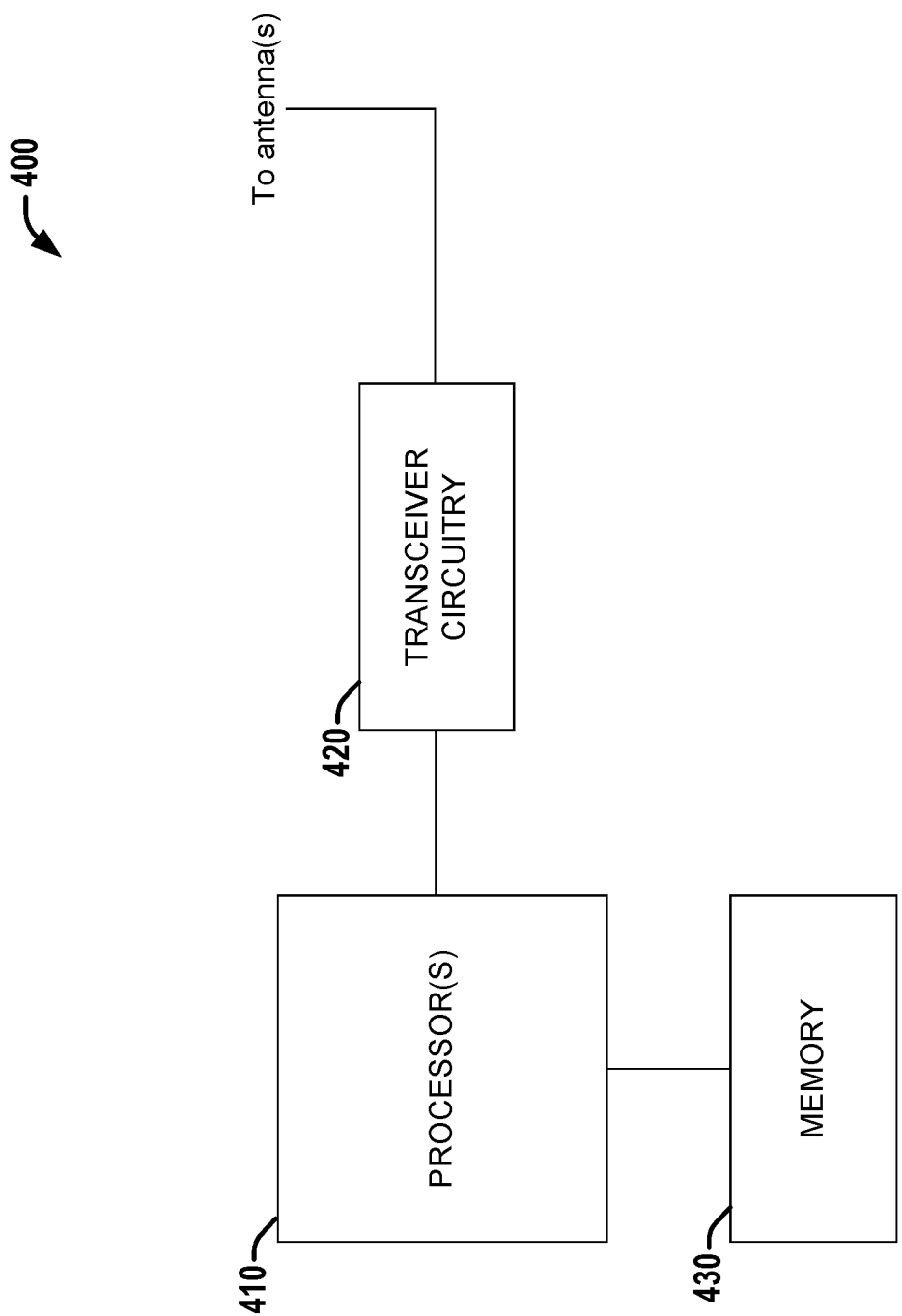
FIG. 4 is a block diagram illustrating a system employable at a UE that facilitates USS reconfiguration in connection with URLLC transmission, according to various aspects described herein.

Referring to FIG. 4, illustrated is a block diagram of a system 400 employable at a UE or other network device (e.g., P-UE device 101/102) that facilitates dynamic or semi-static configuration to provide for resource selection based on partial sensing process(es) and UE behavior with respect to congestion control process(es) or the like according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate configuration for partial sensing, resource (re) selection, congestion control or the like for P-UE operations.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
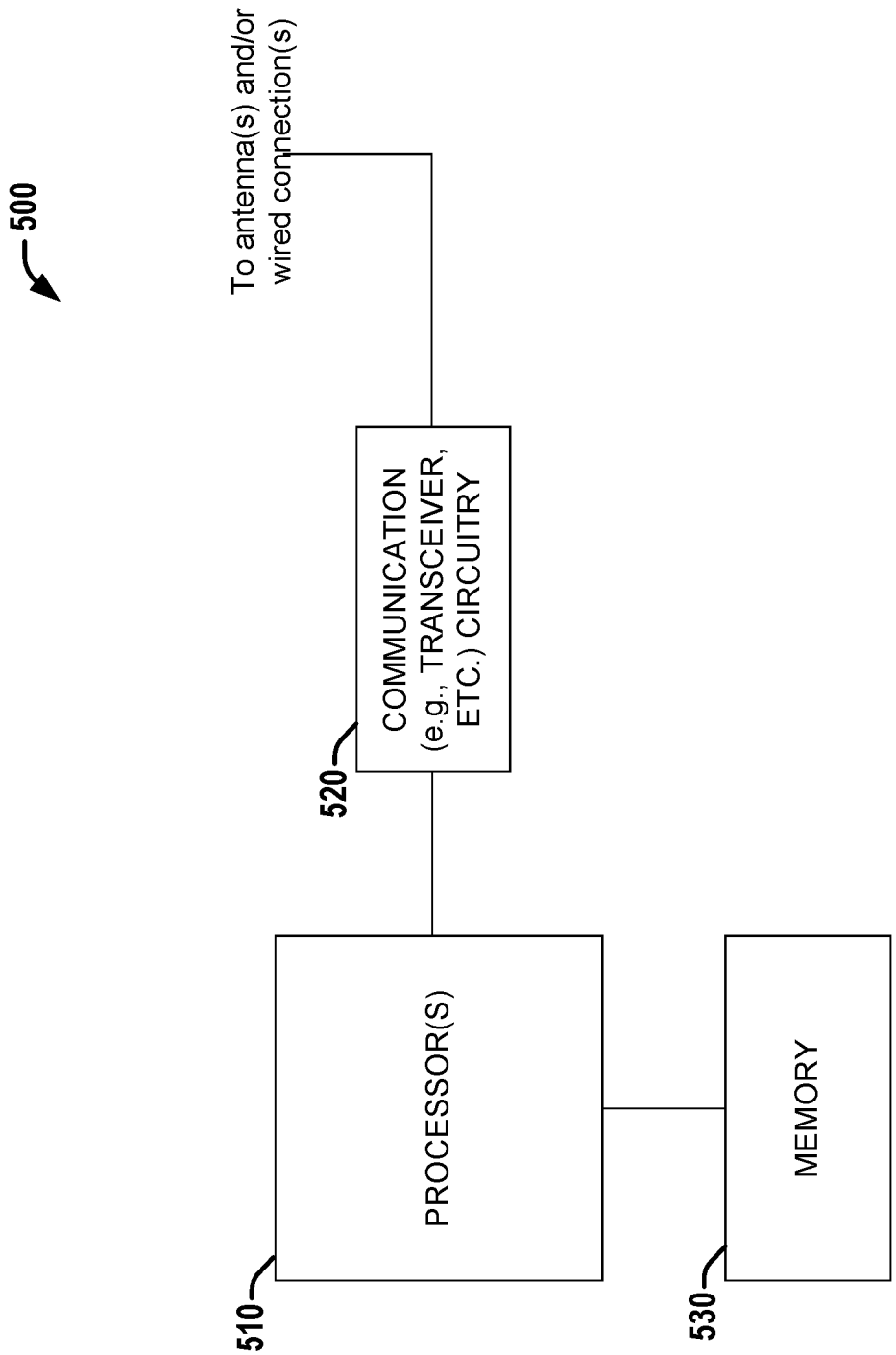
FIG. 5 is a block diagram illustrating a system employable at a BS (Base Station) that facilitates USS reconfiguration in connection with URLLC transmission from one or more UEs, according to various aspects described herein.

Referring to FIG. 5, illustrated is a block diagram of a system 500 employable at a Base Station (BS), eNB, gNB or other network device (e.g., eNB/gNB 111/112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate configuration of UE(s) for transmission of URLLC UE transmission(s) involving adaptable configuration(s) of one or more of search space, control channel resources, CCEs, aggregation levels, time instances, indices or the like.

Figure 6:
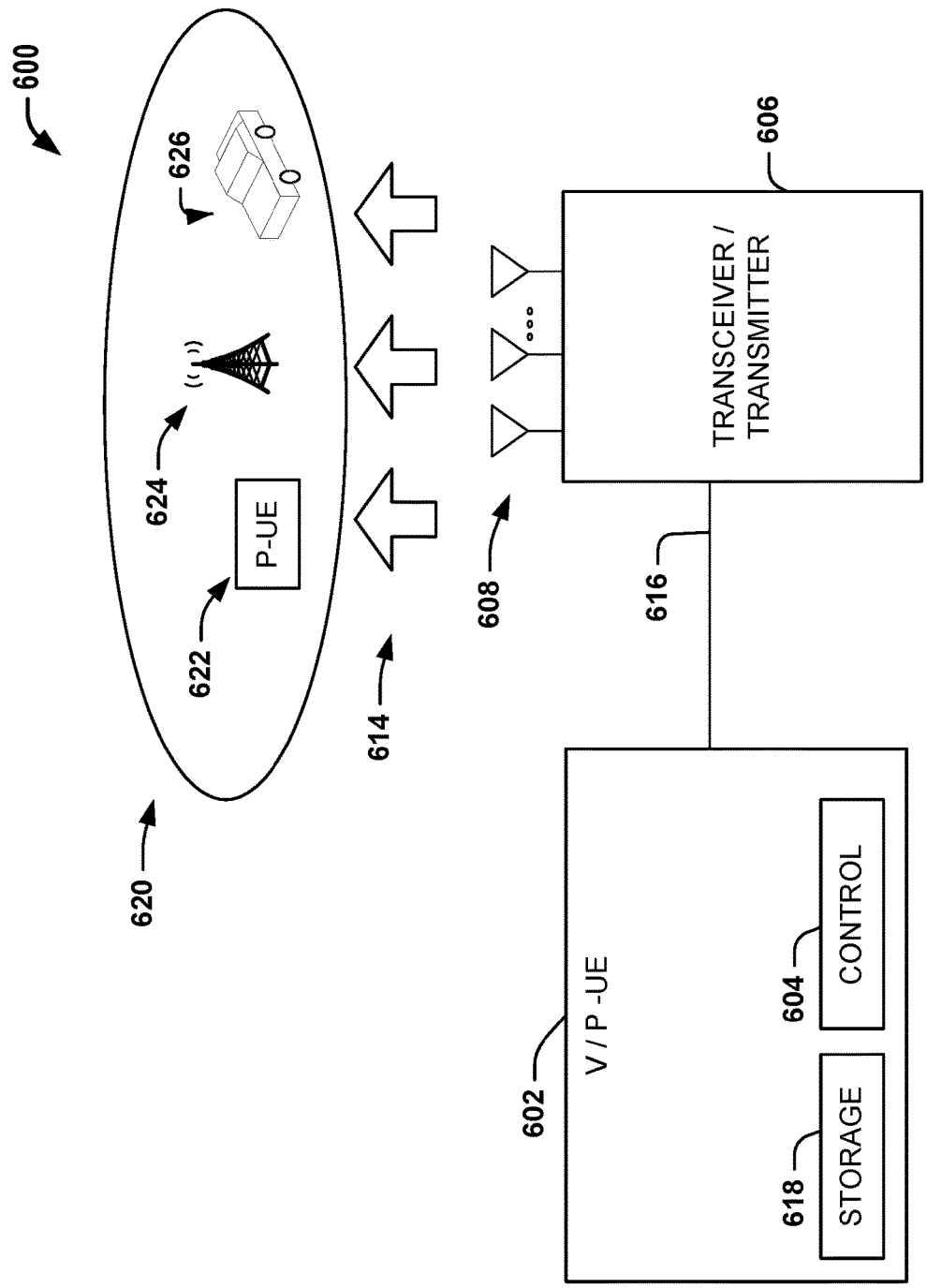
FIG. 6 is a block diagram illustrating a system arrangement for vehicle communications.

FIG. 6 is a diagram illustrating a system 600 for vehicle communications. The system 600, which can also be an apparatus, facilitates broadcast communications by enhancing reliability and accuracy to broadcasted information. The vehicle communications include broadcasts of emergency services information.

The system 600 includes a vehicle/pedestrian user equipment (V/P-UE) 602, a transceiver 606, and vehicle/traffic participant entities 620, which can represent the V-UE 500 or the P-UE 400. Although not shown, other components such as a packet gateway (PGW), a secondary gateway (SGW), a mobility management entity (MME), a packet data network (PDN), UEs, eNB, gNB or the like can be included, as described herein.

The V/P-UE 602 includes the transceiver 606, a storage component 618, and control circuitry or controller 604. The storage component 618 includes a memory, storage element and the like and is configured to store information for the V/P-UE 602. The controller 604 is configured to perform various operations associated with the V/P-UE 602. The controller 604 can include logic, components, circuitry, one or more processors (410, 510, baseband circuitry processors 204A-E, or the like). The transceiver 606 includes transmitter functionality and receiver functionality. The V/P-UE 602 also includes one or more antenna 608 for communications, which includes emergency services broadcast communications 614 with the vehicle/traffic participant entities 620.

The vehicle/traffic participant entities 620 include one or more pedestrians 622, infrastructure entities 624, vehicle entities 626 and the like. The communications between the V/P-UE 602 and the vehicle entities 620 includes Vehicle to Everything (V2X), which includes Vehicle to Vehicle (V2V), Vehicle to Infrastructure (V2I) and Vehicle to Pedestrian (V2P). The entities 620 can also include a road side unit (RSU), which is an entity that supports V2I and is implemented in an eNodeB or a stationary/non-stationary UE/IoT.

The vehicle communications between the V/P-UE 602 and the vehicle or pedestrian entities 620 utilize co-operative awareness that includes information from other vehicles, sensors and the like, to process and share the information to provide vehicle services such as collision warning, autonomous driving, and the like.

The V2V communications are between V/P-UEs that may be served by an evolved universal terrestrial access network (E-UTRAN) or at least one of communicating V/P-UE may be out of network coverage.

The V2I communications include application layer information to RSUs. The RSU sends application layer information to a group of UEs. The V2I also includes vehicle to network (V2N) communication where one party of the communications is a V/P-UE or UE and the other party is a serving entity, where both support V2N applications.

The V2P communications are between distinct UEs, including V/P-UEs and pedestrian associated UEs, where one UE is for each. The V2P communications include V2P related application information.

The emergency services information includes V2X communications and uses including, but not limited to, forward collision warning, control loss warning, V2V emergency vehicle warning, V2V emergency stop use case, V2I emergency stop use, wrong way driving warning, pre-crash sensing warning, warning against pedestrian collision, and the like.

The V/P-UE 602 is configured to broadcast the emergency services information 614 using an emergency services configuration(s) that can include a frame structure, a subframe structure, a transmission procedure, a receive procedure, a resource allocation, transmission power control determination, a modulation coding scheme (MCS) level determination and the like.

The V/P-UE 602 is configured to obtain, select or determine a success ratio for a broadcast of the emergency services information. The success ratio is a ratio based on successfully received broadcasts over dropped/canceled/not received broadcasts by entities 620 within a region or proximity of the V/P-UE 602. Examples of suitable success ratios can include 1, 90 percent, 80 percent or the like. The success ratio can be determined or obtained based on a number of bits in the broadcast, proximity of neighboring V/P-UEs, measured received power information, traffic conditions, vehicle speeds, or the like.

The emergency services configuration facilitates reliable transmission and receipt of the emergency services information. The reliability can be indicated by the success ratio and on other factors including latency and the like. The emergency services information is provided with a low or selected latency. In one example, the V/P-UE 602 transmits emergency services information within 20 milliseconds (ms), the percentage of 620 entities, including other V/P-UEs that accurately receive the emergency services information, should be at or above 95 percent.

Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, or the like. For example, the frame structure has parameters including sampling rate, frame length, subframe length, subcarrier spacing and cyclic prefix length and are based on the obtained success ratio. The subcarrier spacing can be higher, such as 30 kHz or 60 kHz. Transmission resources can include a physical resource allocation (PRA) unit having a number of symbols and subcarriers. The number of symbols and subcarriers is the size of the PRA unit and is typically selected for a smaller size and higher granularity than LTE resource units. The transmission resources also include selected repetitions of the broadcasted information or a repetition rate. The repetitions can enhance reliability in case of interference, noise, and the like. Repetitions can include repetitions in the time domain/frequency domain. A repetition can be in separate frames, within a frame, in separate subframes, and the like. The number of repetitions and whether the repetitions are within separate frames, within a frame, in separate subframes and the like is based at least partially on the obtained success ratio. A subframe can include a control channel and a data channel. The control channel can include control information for decoding and obtaining the broadcasted emergency services information from the sidelink shared channel.

The V/P-UE 602 is also configured for other communications, including unitary communications with other vehicle entities or pedestrian devices. The communications can include receiving broadcasts from other V/P-UEs 602, feedback that indicates reception quality for the broadcast from other V/P-UEs, and the like. The V/P-UE 602 can be configured to transmit and receive concurrently.

In some embodiments/aspects, sensing procedure(s) defined for autonomous resource selection by vehicle UEs can be adapted for P-UEs 602 by integrating partial sensing to reduce UE power consumption and minimize impact on V2V communications. In addition, various embodiments can be compatible with the legacy LTE V2V sensing procedure(s).

In some embodiments/aspects, sensing procedure(s) defined for autonomous resource selection by vehicle UEs can be adapted for P-UEs 602 by integrating partial sensing to reduce UE power consumption and minimize impact on V2V communications. In addition, various embodiments can be compatible with the legacy LTE V2V sensing procedure(s).

The partial sensing operations can be a simplified sensing procedure for P-UE resource selection aiming to reduce P-UE complexity and power consumption. In general, the principles of LTE V2V sensing and resource selection procedure can be used for P-UE partial sensing. For example, a resource (re)selection triggering mechanism can be used. This mechanism can respond to the amount of time when resource reselection is triggered.

The resource reselection triggering mechanism defined for LTE V2V communication and utilized herein as well can include a resource reselection counter, a probabilistic reselection based on a probability to reselect one or more resources, and one or more reselection triggering conditions including whether the UE 602, for example, skips transmission on a preconfigured/predetermined number of resource reservation cycles. In particular, modifications could be considered in a resource exclusion operation and sidelink (SL) received signal strength indication (SL-RSSI) averaging of non-excluded resources.

Additionally or alternatively, resource (re)selection procedure/operations can include a resource exclusion, an iterative formation of a candidate resource set, SL-RSSI averaging of remaining resources, resource ranking and a randomized selection of resources from candidate resource set with minimum received energy. This can then be followed up with/preceded by and then sequentially repeated together with a sensing window/procedure to monitor the spectrum/medium/channels of communication by the UE and neighboring channels or communication devices detected.

For resource exclusion each UE can contain the list of already occupied resources (e.g., physical resource blocks, bandwidth, frequency, reserve intervals, etc.) and can know which ones are occupied by neighbor UEs and other devices. Information about occupied resources may be indicated in communication directly or over a network. Each vehicle and the pedestrian UE monitors the medium and detects the control channel, for example, so it knows the resources being used by some concurrent users/UEs and is able to better independently select its own resources for use.

For the candidate resource set formation some iterative mechanism can be utilized as for V-UEs. Upon the iterative occupied resources exclusion procedure completion, the remaining resources are considered as less congested resources. Further, for each of remaining resource, SL-RSSI averaging is performed across all configured partial sensing windows. Afterwards, the ranking of resources according to the minimum received energy can be performed to form the candidate resource set of predefined size for resource selection for further communication by the UE 602. To select resources for further communication, UE 602 may, for example, use a randomized selection of resources from the candidate resource set. As such, a set of less congested resources could be formed where each UE randomly selects resources to prevent occupation of the same set of resources.

Given that for any candidate resource in subframe y within the candidate set of Y subframes, the P-UE (before resource selection) should sense at least some set of subframes y−100*k, where the set of k is (pre)configured with each element in the range [1, 10], or 1 to 10, the resource exclusion procedure should depend on the set of preconfigured values $K=[k_1, k_2, \ldots, k_N]$, $k_1<k_2<\ldots<k_N$ and detected resource reservations from other UEs in the system. A partial sensing window can be described with K value (an integer value of 1 to 10).

The processing of signals (e.g., input transmissions) to be received in each of the partial sensing windows can be performed according to various aspects or embodiments. The processing or configuration of the partial sensing windows can be done independently at each partial sensing window, conditionally or in a hybrid approach, for example.

Figure 7:
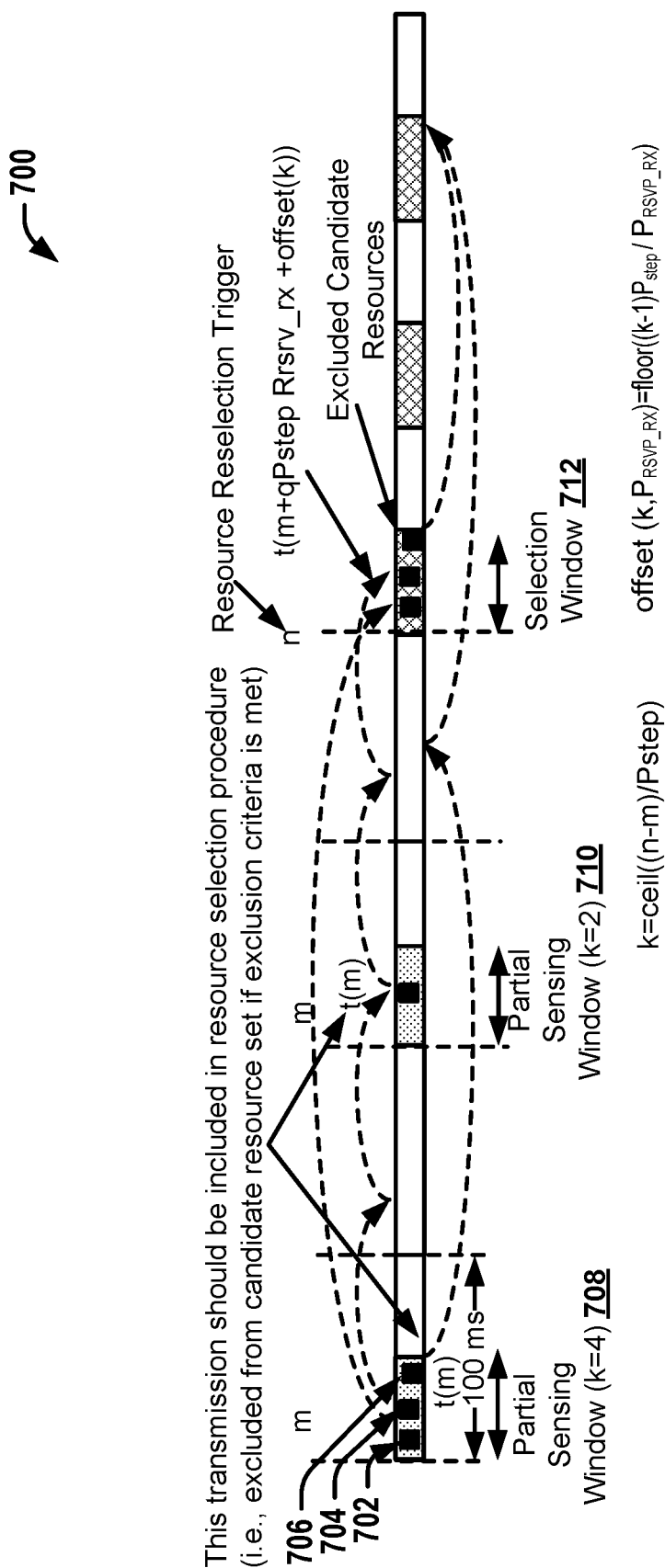
FIG. 7 is a diagram illustrating an example of independent partial sensing window processing, according to various aspects discussed herein.

Referring to FIG. 7, illustrated is an example of independent partial sensing window processing 700 in accordance with various embodiments. Example transmissions 702, 704, and 706 are received within a subframe m that belongs to some configured partial sensing window and processed in a resource selection procedure (i.e., an exclusion from a candidate resource set of the resources occupied by transmissions is performed if certain exclusion criteria are satisfied or met).

The P-UE 602, for example, can process received signals independently in each partial sensing window via one or more processor (e.g., the control 604). A moment (n) represents subframe where the (re)selection of resources is triggered. as a subframe (m), which can be the subframe where transmission(s) from another UE is received.

The partial sensing window(s) 708, 710, comprise a set of time and frequency resources which the P-UE 602 monitors to detect transmissions from other UEs and perform S-RSSI and RSRP measurements to selects the most suitable resources for use from selection window 712. The configured set of partial sensing windows could be described with the set of preconfigured values $K=[k_1, k_2, \ldots, k_N]$, $k_1<k_2<\ldots<k_N$. For example, the partial sensing window 710 fork is equal to 2 and also partial sensing window 708 is related to k equal for 4 as part of the entire or full subframes or duration (e.g., one second, or other larger duration).

In the partial sensing window 708, the P-UE 602 can be activated, turned on, or powered from a sleep mode (e.g., a low power mode of operation), and then monitor the medium, frequency spectrum or a plurality of frequency communication channels involving resources (or parameters associated with generating transmissions or communication). It can then detect some transmission, which, for example, can be transmission 702, 704, 706 or the like as depicted. These transmissions, as received by the P-UE 602, can occupy some resources, which are periodically allocated and can be projected onto some resources within the P-UE (re)selection window (n) (e.g., window 712). Thus, because the P-UE 602 knows these resources are already occupied, the P-UE 602 can operate to exclude these resources from a resource candidate set (e.g., a dataset of storage 618, or other storage). In this example, all transmissions 702, 704, 706 in the partial sensing window 708 can be processed independently. As such, even if the P-UE 602 detects the same resource reservation made concurrently in the partial sensing window 710, the transmissions 702, 704, 706 can be processed independently. In each partial sensing window 708, 710, etc., the P-UE 602 can configure the resource reservation interval of interest that is associated, respectively to the transmissions independently, and with different parameters or durations accordingly. Here, the P-UE 602 can independently treat each partial sensing window allocated, for example, within a 1 (e.g., one) second or other complete sensing window. Thus, if multiple partial sensing windows are configured, the P-UE 602 can independently process each of them, detect all corresponding resource reservation periods and corresponding resources to be excluded from use in generating a transmission for the P-UE 602.

For example, where $K=[k_1=2, k_2=4]$ at partial sensing windows 708 and 710, respectively, as a) for partial sensing window denoted by $k_1=2$, UE processes a sidelink control information (SCI) with all resource reservation periods $P_{RSVP\_RX}=\frac{1}{5}, \frac{1}{2}, 1, 2, 3, 4, \ldots, 10$, for example; and b) for partial sensing window denoted by $k_2=4$, UE processes a sidelink control information (SCI) with all resource reservation periods $P_{RSVP\_RX}=\frac{1}{5}, \frac{1}{2}, 1, 2, 3, 4, \ldots, 10$.

Figure 8:
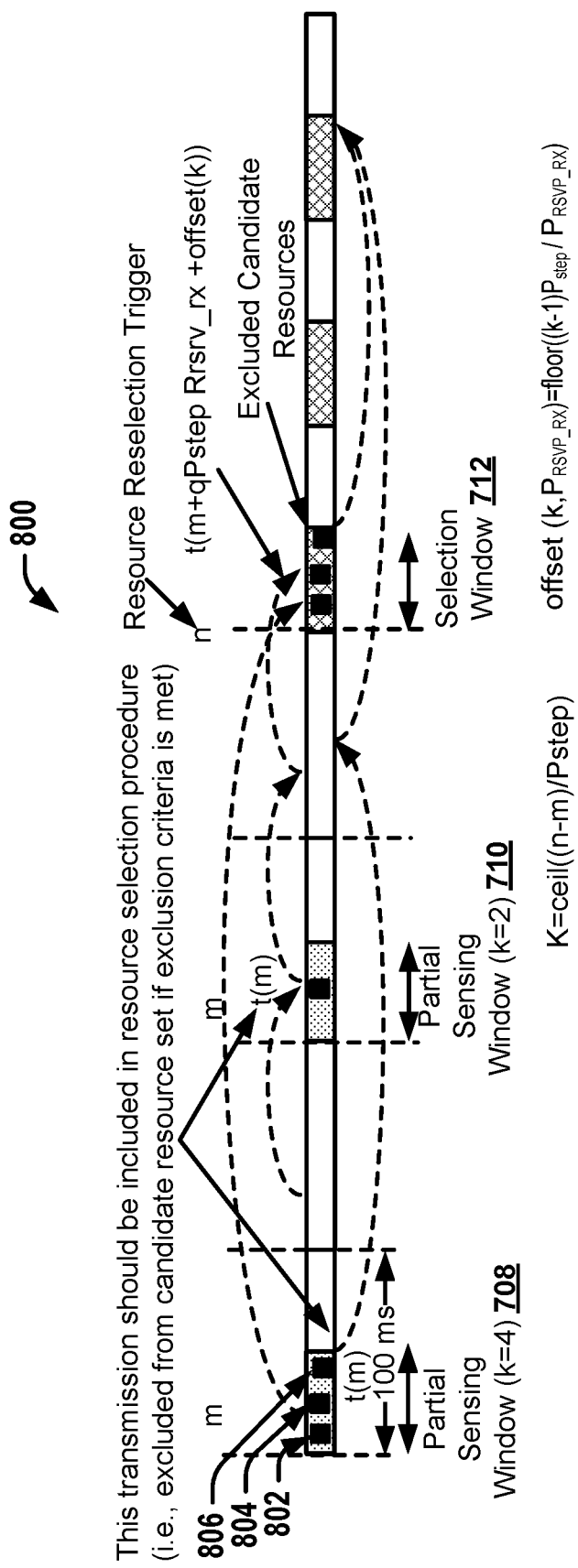
FIG. 8 is a diagram illustrating an example of conditional partial sensing window processing, according to various aspects discussed herein.

Referring to FIG. 8, illustrated is an example of conditional partial sensing window processing 800 in accordance with various embodiments. Example transmissions 802, 804, and 806 can be received within a subframe m that belongs to some configured partial sensing window. and potentially could be processed in a resource selection procedure (i.e., an exclusion from a candidate resource set if certain exclusion criteria are satisfied or met). The P-UE 602, for example, can process most received signals across configured partial sensing windows as a conditional processing via on or more processor (e.g., the control 604). A moment (n) represents subframe where the (re)selection of resources is triggered, as a subframe (m) can be a subframe where transmission from another UE is received.

The transmission situation is similar as FIG. 7, but a most recent transmission can be used for resource exclusion along with prior transmissions. Here, processing of the most actual transmission can be done across configured partial sensing windows. Thus, the transmission 804, for example, from partial sensing window related to k=2, or window 710 can be used and the transmission 806 from partial sensing window 708 related to k=4 can still be used since it was not detected during the recent k=2 partial sensing window. Thus, the P-UE 602 use the most recent transmission detected in all of the partial sensing window as part of resource exclusion. In this case, the reselecting UE 602 performs conditional processing, starting from the most actual partial sensing window (e.g., 710) towards the most outdated one (e.g., window 708) and for each partial sensing window, the P-UE 602 can determine the set of transmissions from other UEs with relevant resource reservation intervals, such as for example where $K=[k_1=2, k_2=4]$; For partial sensing window denoted by $k_1=2$, the P-UE 602 processes SCI with $P_{RSVP\_RX}=\frac{1}{5}, \frac{1}{2}, 1, 2, 3, 4, \ldots, 10$. However, for partial sensing window denoted by $k_2=4$, the P-UE 602 (or V-UE herein) can process SCI with $P_{RSVP\_Rx}=3, 4, \ldots, 10$, since transmissions with other values are already sensed in partial sensing window determined by $k_1=2$.

The conditional processing of resources from the partial sensing window of FIG. 8 can be advantageous for power efficiency because it collects the most recent information from all transmissions instead of utilizing part of the sensed UE transmission resources already reselected and thus not necessarily taken into account subsequently in other partial sensing windows. The drawback of the first approach (with independent sensing per each partial window) is that part of the sensed UEs potentially already reselected resources and reselecting UE will not take it into account thus degrading its sensing decisions.

In another aspect, a hybrid approach can be considered and in this case the P-UE 602 can configure/define a table or a set of resource reservation intervals $P_{RSVP\_Rx}$ that should be processed at each of the partial sensing windows defined by the set $K=[k_1, k_2, \ldots, k_N], k_1 < k_2 < \ldots < k_N$. This approach can simplify UE implementation and specification of partial sensing procedure.

In any of these options, aspects, embodiments, the transmission resources extrapolation can also be performed or used to extrapolate detected resource reservations (resource reservation windows) from other UEs to determine whether they could potentially collide with its own resource (re) selection decision. In one problem when the P-UE 602 monitors some partial sensing window 708, it can detect some transmission (e.g., 702, 704, 706) with any duration period according to a corresponding reservation period and the current V2V resource reselection procedure from the next resource transmission opportunity that is taken into account during the resource reselection process. However, as the P-UE 602 monitors, the partial sensing window 708 could be some distance between the received information and a selection window that could be larger than the resource reservation interval. Thus, the P-UE 602 could extrapolate information about resource reservation.

Therefore, if UE detects sidelink control information (SCI) format in subframe $t_m^{SI}$ of partial sensing window k determined by the value $k=\text{ceil}((n-m)/P_{step})$, where n is the reselection trigger time instance, the UE can assume that the same SCI is to be received in subframe after the resource reselection triggering instance n:

$$t_{m+q \times P_{step} \times P_{rsvp\_RX} + \text{offset}(k, P_{rsvp\_RX})}^{SL},$$

where $\text{offset}(k, P_{rsvp\_RX}) = P_{step}\text{floor}((k-1)P_{step}/P_{rsvp\_RX})$, which overlaps with $R_{x,y+jP_{rsvp\_TX}}$ for $q=1, 2, \ldots, Q$ and $j=0, 1, \ldots, c_{resel}-1$.

Here, $$Q = \frac{1}{P_{rsvp\_RX}} \text{ if } P_{rsvp\_RX} < 1 \text{ and } n - m < P_{step} \times P_{rsvp\_RX},$$

and Q=1 otherwise.

In this above example, the P-UE 602 can derive the value k which relates to partial sensing window, wherein (n) is the resource reservation subframe index where the resources is actually is triggered; (m) is the subframe index where the concurrent resource allocation (or subframe where SCI) is received; and $P_{step}$ is a parameter defined in LTE Technical Specification(s). $P_{RSVP\_Rx}$ can be the resource reservation period(s), where the sidelink communication can be assumed. The set of possible is $P_{RSVP\_Rx}$ values is predefined and known.

A predefined offset can be introduced to exclude resources corresponding to reservations with different resource reservation intervals booked/reserved in partial sensing windows. This procedure can help to properly exclude reserved resources.

As such, in an aspect, for each partial sensing window denoted by "k", the P-UE 602 can be configured with the set of resource reservation intervals $P_{rsvp\_RX}$ that could be taken into account in resource exclusion step of resource reselection procedure.

The partial sensing window referred to herein thus is configured with k values and a basic configuration for any candidate resource in a subframe that is configured within the resource candidate set, as discussed above, the P-UE 602 sensing on a subframe index minus 100 multiplied by k and it can specify in which subframes that each P-UE should monitor the medium for occupied resources/transmissions (e.g., 702, 704, 706, etc.).

A same iterative procedure can be used to find the candidate resource set that is at least X % (e.g., X=20%) of total available resources for selection within UE resource (re)selection window of resource candidates for exclusion or use. The 3 dB adjustment of priority dependent reference signal received power (RSRP) thresholds can be reused to form the candidate resource set of the predefined size.

In another aspect, a sidelink (SL) received signal strength indication (SL-RSSI) averaging of across the monitored/non-excluded resources in time for the partial sensing window can be done by the P-UE 602. The ranking of resources according to the minimum received energy can be reused to form the set of resources for selection of size Y (e.g. Y=20% of total available resource for selection).

In a particular further embodiment, in case of P-UE partial sensing, the SL-RSSI measurement by the P-UE 602 can averaged across all partial sensing windows. In addition, a randomized resource selection from the candidate resource set can be reused in cases of partial sensing processes herein.

In cases of partial sensing process(es)/operation(s) by the P-UE 602, the duration of each partial sensing window can be preconfigured by the eNB (e.g., 111/112) and modified or reduced in order to reduce the UE power consumption by the P-UE 602. In particular, the duration of the partial sensing window of 10-20 subframes can be sufficient for P2V or V2P communication, for example. As such, the duration of the sensing window can be minimized by the P-UE 602 and can be (pre)configured or dynamically modified for power consumption efficiencies.

In an aspect, the number of partial sensing windows that the P-UE 602 can monitor for resource reselection can depend on UE resource reservation interval. For example, the P-UE 602 utilizing/processing a relatively short transmission period can be forced to monitor/sense more frequency, such as with more partial sensing windows where $K=[k_1, k_2, k_3, k_4, \ldots, k_n]$, while the P-UE 602 which transmitting infrequently can be requested to monitor limited number of partial sensing windows (i.e., reduced set of partial sensing windows $K=[k_1, k_2]$.

The possible set of P-UE resource reservation intervals can be (pre)-configured by the eNB 111/112 (e.g., range or set of allowed resource reservation intervals). Further, the eNB 111/112 can (pre)configure the set of partial windows to be sensed for each of P-UE resource reservation interval as well.

In other embodiments, the resource (re)selection window can be enhanced to account for partially available or not available partial sensing results by the P-UE 602. This situation could be caused by some time shift in resource reselection trigger that goes by, for example, with a late packet arrival from an upper layer. Here we can consider two situational cases: the $1^{st}$ case, when the reselection window partially overlaps a currently defined or currently used resource reselection window. In this case, the resources with measurements can be used and P-UE 602 select resources from the partial sensing window which were monitored. Otherwise if no sensing information is available or the number of resources is not sufficient, then the P-UE 602 can randomly select resources until a new partial sensing results (candidates) are available. In general, the duration of partial sensing window would normally be aligned with the duration of resource (re)-selection window. The start time of resource (re)-selection and partial sensing windows can be left up to UE implementation.

In an embodiment, the start time of the resource (re)-selection window and corresponding partial sensing windows can be left up to the discretion of the UE implementation (e.g., based on or according to a latency budget constraint).

In some aspects of the P-UE 602 behavior, when partial sensing results are not available, for example, when a new packet arrives and its transmission is supposed to be done outside of the current resource selection window or in partially overlapped window, various embodiments can be utilized.

If in case, the new resource (re)-selection window partially overlaps with the current selection window, then if there is a valid candidate resource for selection, the P-UE 602 can (re)-select it and trigger partial sensing and resource reselection procedure corresponding to new/updated resource selection window, where current resource does not fit or is able to be used. If there is no available candidate resource, the P-UE 602 can be enabled to transmit randomly until new partial sensing data are available (the partial sensing procedure can be triggered so that UE reselects resource already for the next transport block (TB) transmission or after reselection period).

In the situations/cases, where the new resource (re)-selection window does not overlap with the current selection window, various other aspects can be enabled at the P-UE 602 (vehicle UE throughout herein). In particular, where the previous partial sensing results are valid or partially valid/available (e.g. collected within T time interval back, T=1 second), the P-UE 602 can use valid partial sensing results for a temporary resource selection. The temporary resource selection can be done by a re-interpreting or re-interpretation of the set of configured partial sensing windows ($K=[k_1, k_2, k_3, \ldots, k_N]$) to the new set ($K'=[k_1', k_2', \ldots, k_M']$) according to the available partial sensing windows within T time back from temporary resource reselection instance 'n'. In this case, the P-UE 602 can either use this temporary resource till the next resource reselection or reselect a temporary resource when new partial sensing results/resource candidates corresponding to new resource (re)selection window are available. At the same time, the P-UE 602 can trigger a new partial sensing process that is actually aligned with the updated resource selection window and use the configured set K for partial sensing windows.

Figure 9:
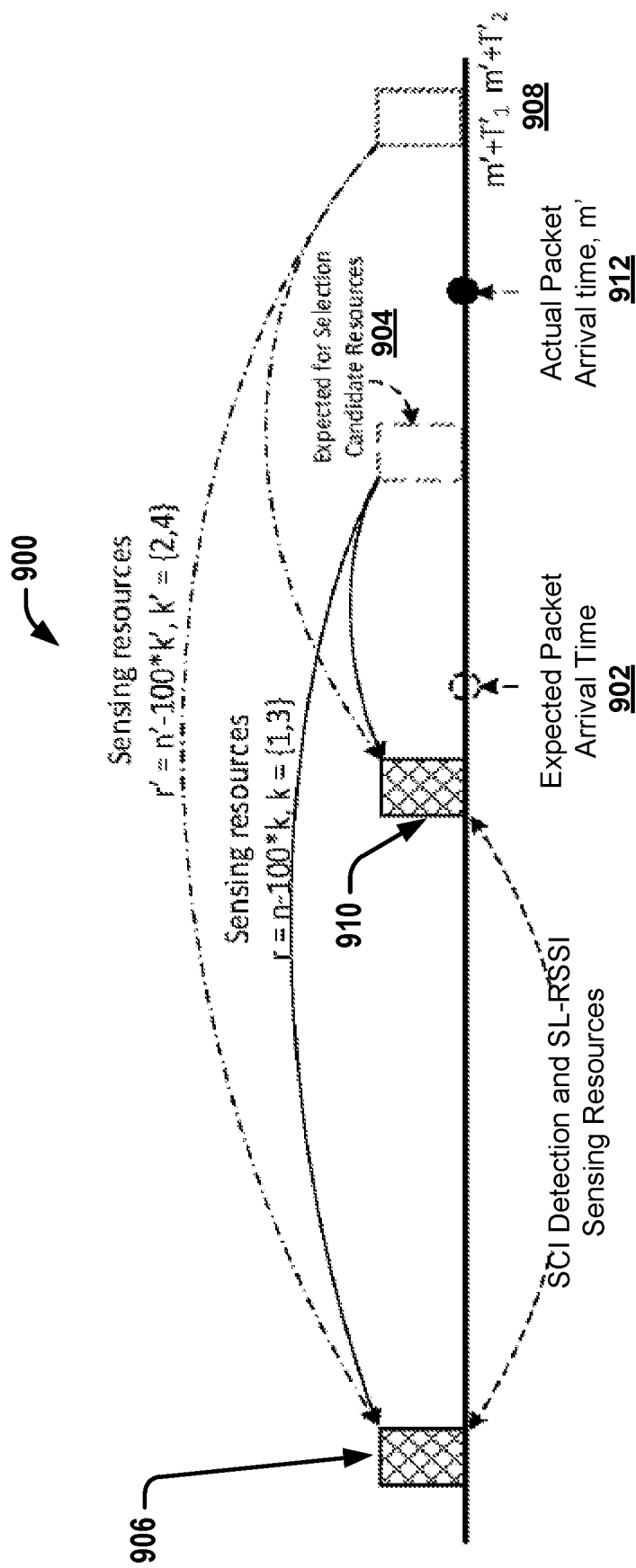
FIG. 9 is a diagram illustrating an example of resource (re)selection with reinterpretation of partial sensing window configurations, according to various aspects discussed herein.

Referring to FIG. 9, illustrated is an example where the results of a candidate resource set or partial sensing window sensing operation results 900 can be configured and re-interpreted according to aspects herein. At 902, is an expected arrival time 902 of expected resource selection trigger subframe 904, 908 that is received at the P-UE 602. However, due to some higher layer decision the packet is not received by the physical layer, and the actual packet arrival time 912 is different, as denoted as m'. Thus, despite a significant shift in the reselection trigger subframe 912, the sensing results can be at least partially available. As such, when the P-UE 602 detects this condition and can reinterpret the configuration of partial sensing resources, for example, instead of the set of K or k values 1 and 3, the P-UE 602 can use the modified values, which can now be k' equals 2 and 4, for example. Now the P-UE 602 can use the modified set of resource partial sensing window k' with 2 and 4 values, and the P-UE 602 can reinterpret the already configured partial sensing window and use this information following the procedures described herein.

In aspects where, the previous partial sensing results are determined to be outdated (e.g. outside of T time interval back, T=1 second), the P-UE 602 can either select one or more resources randomly and reselect it when partial sensing results become available, or drop transmissions until the partial sensing results are available and reselect resource(s).

In aspects, where resource reselection triggering at the P-UE 602, if previous partial sensing results are valid or partially valid, the P-UE 602 can select a temporary resource for transmission in a new resource (re)-selection window, by re-interpreting the set of partial windows according to the example of FIG. 9. P-UE 602 can reselect one or more temporary resources until new partial sensing data from further partial sensing windows with (re)selection window configurations are available.

Figure 10:
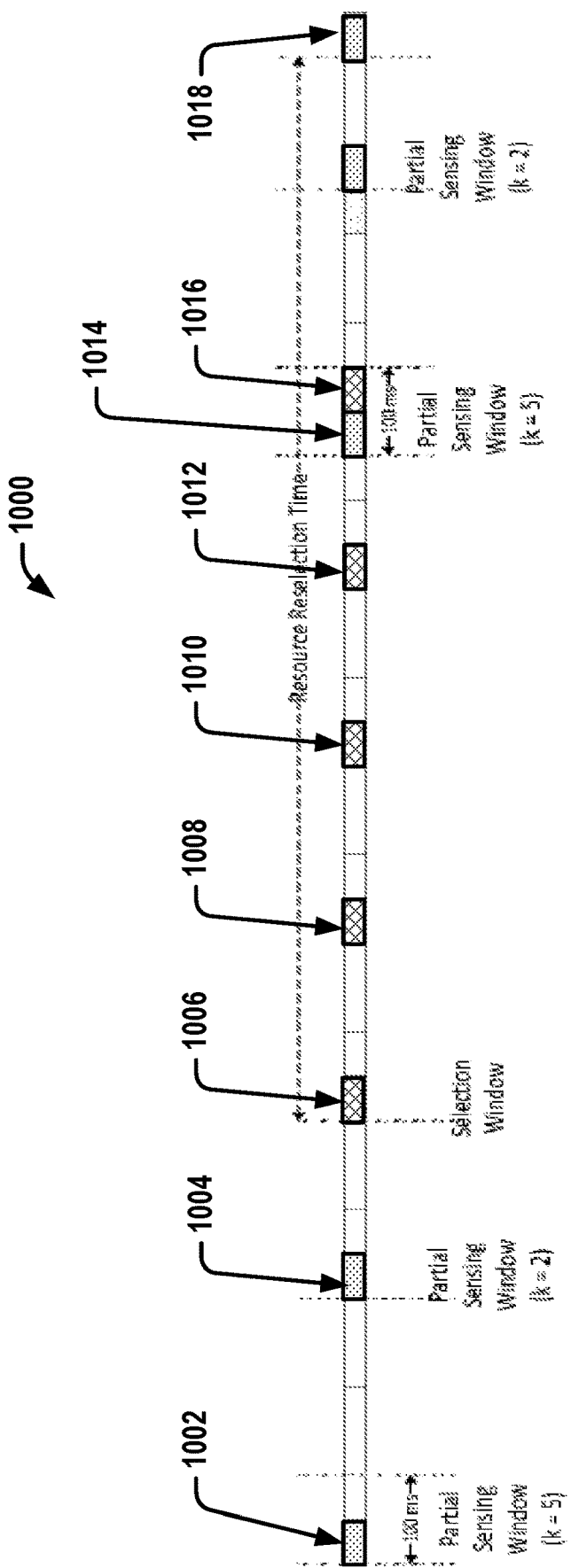
FIG. 10 is a diagram illustrating partial sensing behavior and resource selection periods, according to various aspects discussed herein.

Referring to FIG. 10, illustrated is an operation 1000 where the P-UE 602 skips partial sensing between resource reselection in accordance with various aspects or embodiments herein.

In embodiments, the P-UE 602 sensing behavior and resource selection period between two or more consecutive resource (re)selection trigger events or intervals can enable a minimization of power. In particular, the P-UE 602 is supposed to reselect resources every resource reselection period after transmission of selected number of TBs according to a randomly selected resource reselection counter. There could be, for example, various UE behaviors to enable or facilitate power minimization.

In one aspect, for example, the P-UE 602 can skip partial sensing between resource reselections 1006 thru 1018 and wake up to perform partial sensing 1014 before a next resource reselection cycle 1018. Here in this embodiment, the P-UE 602 can skip partial sensing between resource selections (e.g., resource (re)selection windows 1008, 1010, 1012, 1016) and wake-up and to form partial sensing before next resource election cycle. In this example, the P-UE 602 can monitor only resources when the P-UE 602 knows when the resource selection 1018 will be triggered (e.g., by a counter or certain number of scheduling units/subframes/etc. The P-UE 602 then monitors only a certain amount of resources in a limited number of partial sensing operations. Resource (re)selection window 1018 can be used by the UE to select resources when resource reselection time has become expired, for example.

As such, operations of reselection candidates or resources 1000 of FIG. 10 can involve a resource selection period when the (re)selection window is further sense selection window and after the resource selection time a next selection window 1018 is expected, and the partial sensing window 1014 can be configured in which resources are then sensed or scanned for again. Here, the P-UE 602 performs no sensing during the reselection cycles 1006 to 1018 during the resource reselection time.

In an aspect, in situations where the P-UE 602 does not know the actual reselection time, it could consider that selection window appears with some periodicity and monitor or perform partial sensing more frequently, but if it knows the reselection time it knows the next reselection window and can perform partial sensing less frequently.

Thus, the P-UE 602 can be configured to enable skipping of partial sensing between consecutive resource reselections 1006-1016, and wake up to perform partial sensing 1014 according to the partial sensing window configuration of partial sensing windows before the next resource reselection 1108. The P-UE 602 can also be configured to perform partial sensing with respect to its own resource reservation time instances (resource selection windows).

Figure 11:
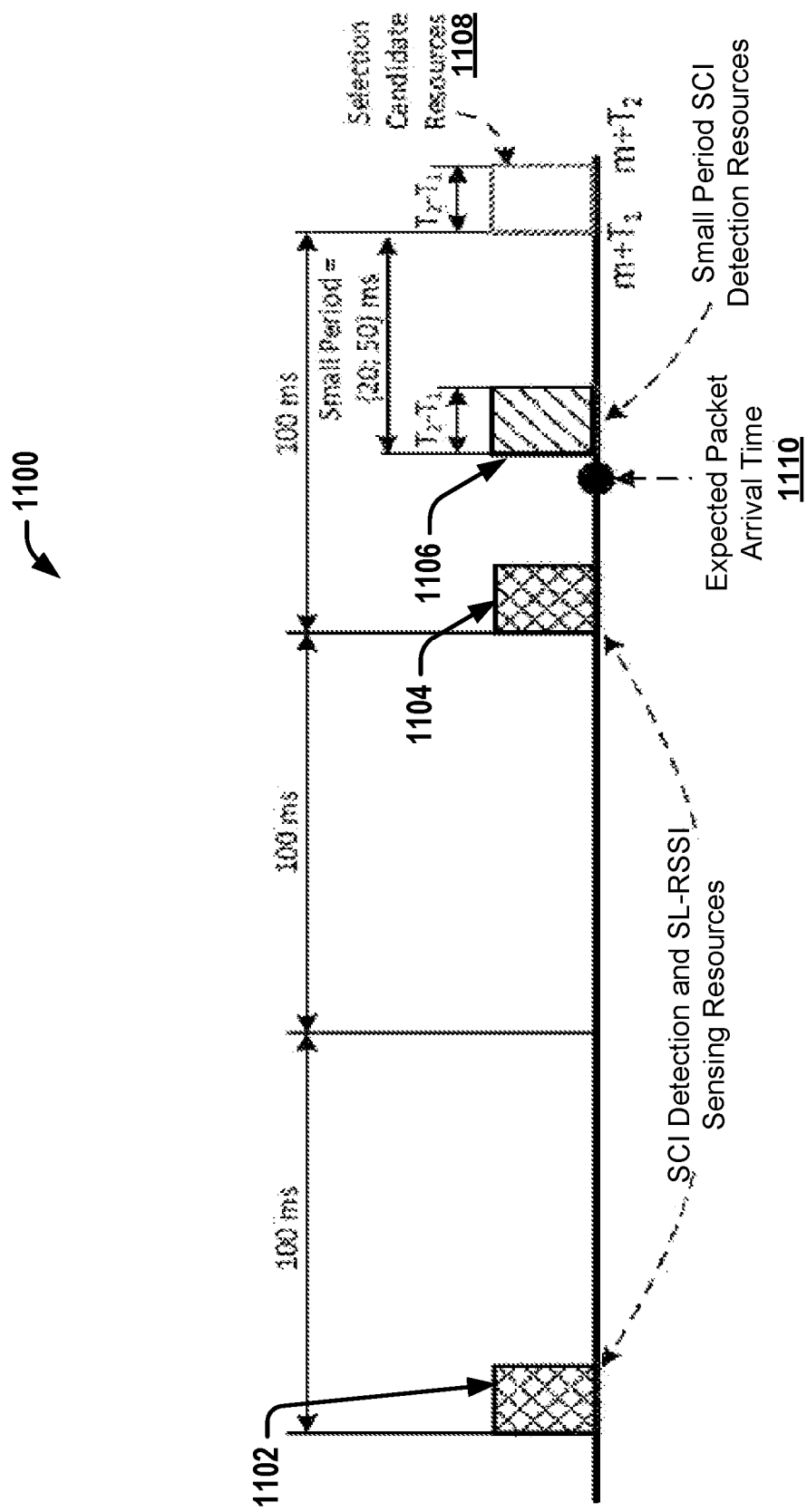
FIG. 11 is a diagram illustrating configurations of small period SCI detection resources, according to various aspects discussed herein

Referring to FIG. 11, illustrated is an example processing operation with resource reselection based on a detection of short transmission periods or short period transmissions 1100. For example, the P-UE 602 can be configured to enable an extended set of resource (re)selection window configurations K where resources are monitored for sensing (e.g., in partial sensing window) 1102, 1104 before the actual resource reselection resources 1106.

In particular, for any candidate resource in a subframe (y) within a set of Y subframes, the P-UE 602 can be configured to sense at least subframe n−100*$k_i$, where the set of K is (pre)configured with each element $k_i$ in the range [1, 10], or 1 to 10. In an aspect, when short transmission periods (e.g., 20 ms, 50 ms transmission periods/intervals or the like) are enable in shared resources pools, the P-UE 602 could miss the actual information on the 20 ms or 50 ms transmission due to faster (re)selection. As such, various embodiments for processing these short transmission periods can be utilized.

In an embodiment, the P-UE 602 can receive/process (e.g., via the eNB/gNB 111/112) a restriction configured on partial sensing window. For example, the eNB/gNB 111/112 could signal or always enable $k_1$=1 in the configuration of the partial sensing windows 1102, 1104, so that the P-UE 602 can gather the most recent resources and detect short period transmissions 1106. In this case the P-UE 600 can monitor the most recent resources and detect short transmission periods upon packet arrive (m) 1110.

In another embodiment, the V-UE or user performing short transmission periods could reselect resources readily and achieve this with use of reselection counter scaling. In this case, resource reselection counter for 20 and 50 ms transmission period can be scaled to increase resource reselection time and make it similar to the one for a 100 ms transmission period, for example, and be easier to detect without further configuration at the P-UE 602. Scaling or resource reselection counter scaling can be applied at the side of the communications by the UE that transmits data with the short period, as opposed to the side (e.g., a P-UE) detecting the short period transmissions.

In another embodiment, the P-UE 602 can be configure for proper resource exclusion by pre-configuration of resource reservation intervals to be taken into account resource resources as configured separately for exclusion for each partial sensing window configured by the set K=[k1, k2, k3, . . . , kN]. This was already discussed earlier as the hybrid approach where for each partial sensing window there is a separate set of resources reservation interval as specified or determined.

In a further embodiment, the P-UE 602 can configure complimentary partial sensing windows and define one or more of these as a set of K values differently. For example, where before the windows may include configuration with k as an integer of 1 up to 10, now the P-UE 602 can include additional values of K, such as one fifth and one half. In this case, for any candidate resource in subframe y within the set of Y subframes, P-UE 602 can sense at least a subframe n−100*ki, where the set of K is (pre)configured with each element ki in the range [⅕, ½, 1, 10].

The P-UE 602 can thus configure or extend the set of possible partial sensing window configurations K by additional ki elements range [⅕, ½] on top of or in addition to the range [1, 10].

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

In other embodiments/aspects, congestion control can be utilized to overcome the situation of high congestion at the resources for V2V/V2P/P2V/V2I communications. For example, if the density of the UEs in an area or network exceeds a threshold number in a very high in a traffic jam or in freeway traffic jam, there can be too many vehicles trying to transmit data, and thus, create very high indifference in communication flow or blockage. As a result, the performance of V2V communication could be very low. In such situations, some additional procedure could be utilized for congestion control. For example, a number of resources allocated to each UE to control the transmission power, or some other parameters could be allocated and referred to as congestion control.

Figure 12:
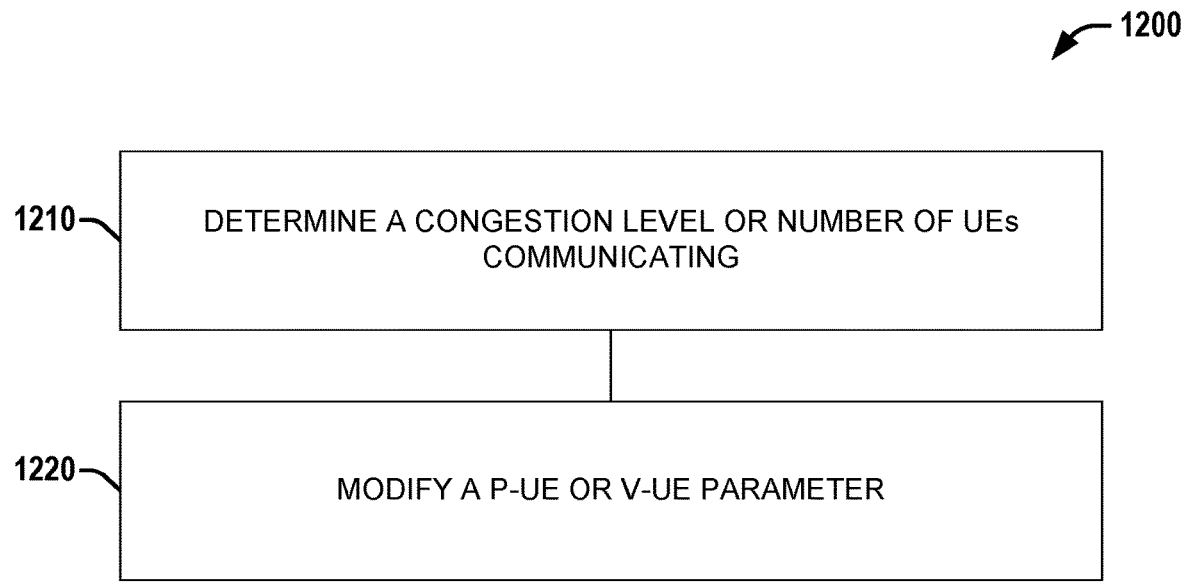
FIG. 12 is a flow diagram of an example method employable at a UE that facilitates congestion control, according to various aspects described herein, according to various aspects discussed herein.

Referring to FIG. 12, illustrated is a method 1200 for controlling congestion via a vehicle or pedestrian UE according to various aspects described. The process flow 1200 initiates at 1210 with determining a congestion level, congestion threshold amount, or a number of other communications or UEs detected in an area or network on a spectrum, on a same channel, neighboring channel(s), or a range. Then, at 1220, the P-UE 602 or V-UE 602 can modify a parameter such as a transmission parameter for congestion control in response to, or based on the determined number of other UEs communicating, or resource reservation signals detected.

In many instances, for example, congestion control can be based on two main measurements (parameters): Channel Busy Ratio (CBR) or occupancy ratio (CR). A Channel Busy Ratio value can be measured by the P-UE 602 so the UE senses the medium/spectrum/channel(s) and determines the number of resources where an RSSI value (or other power measurement) satisfies or is above defined threshold. The CR (or occupancy ratio as defined in LTE) can be the ratio of number of resources used by P-UE 602 to the total number of resources in some predefined time interval. Thus, the CR_limit can refer to as the maximum limit or occupancy ratio that is allowed for a UE, either (pre)defined by the eNB/gNB, higher layer signaling, or allocated by the UE itself. Additionally, depending on the CR_limit, each UE (V/P-UE 602) can be configured to adjust its transmission parameters or criteria for communication, which can include one or more of: transmit power, modulation and coding scheme (MCS), number of occupied sub-channels, number of TTIs, the resource reservation interval (related parameters), attempts to increase/decrease TTIs, range of retransmission per TB, range of physical sidelink shared channel (PSSCH) sub-channels, range of MCSs, or other associated radio-layer parameters.

The max transmit power, range of retransmissions per transport block (TB), range of PSSCH sub-channels, range of MCSs and maximum limit on occupancy ratio (CR_limit) can be a radio-layer parameters can be restricted or controlled by congestion control based on CBR value. Another parameter is the resource reservation interval. The resource reservation interval can restrict inter-TB transmission time. The same effect can be achieved by the P-UE 602 controlling the message generation rate at the application layer. Given that CBR measurements are shared with upper layers, the application layer can adapt message generation rate to control the level of congestion based on a congestion level or predefined level of detected congestion by P-UE 602, for example. If application layer congestion control is not enabled (e.g., by the gNB), the radio-layer congestion can perform a similar function. At the radio-layer, there can be various options that the UE can use to control the UE transmission rate as congestion control mechanisms aiming to reduce amount of transmissions in a given time interval.

In an aspect, the P-UE 602 can monitor and control the reservation period. An additional parameter that can be used for adaptation or modification at 1220 can be the resource reservation period. Thus, depending on the measured congestion level the P-UE 602 can select/modify a resource reservation period. For example, if P-UE 602 has a 100 ms transmission but congestion level is too high (above the defined threshold for number of UEs in a coverage area detected), the P-UE 602 can use the 200 ms or 400 ms reservation interval instead of a 100 ms reservation interval, or modify processing to another interval based on the congestion level. For reservation period control, the radio-layer can control the minimum time between inter-TB transmissions. For example, the transmission rate can be decreased from 100 ms to 200 ms or 400 ms, where all packets that were generated between transmissions and have out of bound/threshold latency budget could be dropped by radio-layers. Alternatively, the radio-layer (or P-UE 602) can just provide the value of resource reservation period to upper layers (another UE, eNB/gNB, other network device, or component), so that the upper layers generate packets with the corresponding transmission rate. The mechanism to control resource reservation period can be aligned with the resource reselection timescale, for example, so that UE performing resource reselection can decide on the proper resource reservation period value for the upcoming reservation cycle. In particular, a minimum and maximum value of a resource reservation period can be configured for different CBR ranges by the UE 602, for example.

One potential drawback of this method is rather coarse granularity of the transmission rate control and probability that different UEs can end up with different transmission rates, which can result in unfair behavior. In addition, change of the resource reservation period also increases the time between resource (re)-selections according to legacy procedure. This approach, however, could also align with LTE packet saving procedures.

Figure 13:
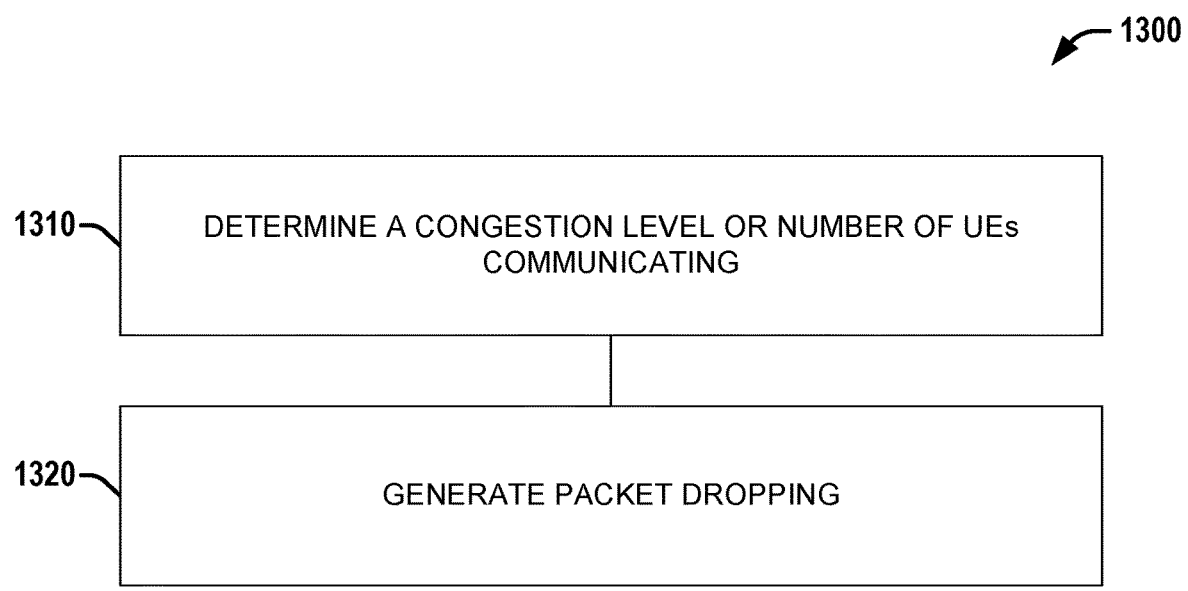
FIG. 13 is a flow diagram of an example method employable at a UE that facilitates congestion control, according to various aspects described herein, according to various aspects discussed herein.

In another aspect, FIG. 13 illustrates another aspect of a method 1300 for congestion control that the V/P-UE 602 can enable. At 1310, the UE 602 can determine or detect a congestion level or number of UEs for determining satisfaction of predefined congestion threshold, for example. At 1320, the UE can generate packet dropping. In this embodiment, the UE 602 can still use the same resource reservation period at the basic 100 ms value, but to satisfy occupancy ratio limits can drop the packet transmission. This behavior is not aligned in the LTE packet saving procedure because the UE signals information about occupied resources (e.g.

list of resources and reservation period), but packets are actually dropped, resulting in resource allocation information loss and, hence, overall resource selection procedure performance degradation. Consecutive drop of several packets could also have an impact on application layer. The packet dropping at the radio layer assumes that for each packet in radio-layer buffer, the UE decides whether to transmit it or not based on instantaneous CBR and CR measurements.

Alternatively or additionally, a mixing of the embodiments of FIGS. 12 and 13 can be envisioned, in which the reservation period control and packet dropping control can be enabled. This mixed approach can allow for some flexibility since the UE can use more correct resource reservation inter-signaling (between other UEs/network devices), but could also drop some or a subset of packets in response to the congestion level becomes too high or exceeding a congestion threshold, for example. This can provide finer granularity of the UE transmission rate and can have reduced impact on sensing and resource selection procedures for given CBR level since the amount of packets that are dropped within resource reservation time can be more accurately predicted and can be limited to certain percentage.

Further, congestion control could operate on top of sensing and resource selection procedure, and should not trigger additional resource(s) reselection, or should minimize the trigger of resource selection in order to not degrade the V2V/P2V communication performance substantially as a result. The autonomous sensing and resource selection should also not affect congestion control behavior. On the other hand, it can be assumed that as a result of congestion control the higher layers or the eNB/gNB can restrict the value(s) or range of resource reservation period selected by the UE. In addition, evaluation or update of congestion control metrics can be aligned with resource reselection triggering, which does not necessarily imply that other CBR/CR related measurements cannot be used for congestion control.

In an aspect, the parameters (or predetermined criteria) (e.g., CBR/CR, or the like) can be measured with or among multiple resource pools. Each UE, for example UE 602, can be configured to select resources within a set of resources, referred to as a resource pool, and the UE can monitor one or several resource pools. In response to the monitoring, the UEs can select resources in different resource pools.

For example, CBR/CR measurements can be made as a zoning based resource selection, or per resource pool. When multiple pools are configured to enable geo-location zoning principle for resource selection, for example, the UE can provide CBR measurement for each zone/pool and can be allowed to select resource from other zone/pool if CBR measurements corresponding to different pools show that some of the pools are underutilized. This mechanism can reduce the congestion problem in different geo-zones by borrowing resources associated with other geo-location zones in case if congestion level in these zones below preconfigured threshold.

In an aspect, CBR/CR measurements can be not done on an exceptional pool, which can be used, for example, during handover between base stations when sidelink transmission is controlled by the eNB/gNB 111/112, or when resource sensing results are not available.

CBR measurements across multiple pools can be used to enable resource pool selection for V2V/P2V/V2P transmissions. Pool specific CBR thresholds can be configured to enable resource selection across multiple transmit pools. CBR measurements can still be performed for the preconfigured set of RSSI thresholds, for example.

Other aspects configured by the UE 602, for example, can relate to CBR/CR measurement frequency and filtering. In particular, there can be various embodiments for how the UE measures/updates CBR/CR. One approach, for example, can be to measure/update these metrics prior each packet transmission. Another approach can be to measure/update CBR/CR values during resource reselection, which is in the resource reselection trigger subframe.

However, it can beneficial to measure/update CBR/CR in the first approach if the UE optimizes communications by a change/adjust of some packet parameter or it is allowed to drop the packet. In this case, it is better to evaluate CBR value and decide what to do prior to packet transmission. For packet dropping based congestion control, it can be appropriate to measure/update CBR/CR prior to actual packet transmission to decide on packet transmission.

For resource reservation period based congestion control, it can be appropriate to measure/update CBR/CR prior to actual resource reselection to determine transmission parameters for configuring or determining the resource reselection period. For example, CBR/CR measurements/updates could be allowed since the UE can be expected to make a decision on resource reservation and other radio layer parameters when it performs resource reselection.

Independently of CBR/CR measurement/update operations, the UE 602 can determine whether CBR/CR measurements are filtered or not. The instantaneous CBR measurement, for example, can be done at L1 cross resources within a 100 ms window duration, while CR measurement can be estimated over a 100 ms time interval. If CBR averaging is used, it can cause correlated congestion decision by multiple UEs in the same proximity area, especially if packet drop mechanism is applied for congestion control. For congestion control based on resource reservation period adaptation, the averaging can be more beneficial, but can cause longer adaption time In particular there could be no restriction when the UE measures CBR/CR. Alternatively or additionally, the CBR or CR can be measured prior packet transmission and prior resource reselection.

In other embodiments, the UE can implement radio layer parameter adaptation with other parameters as well. For example, the other parameters could be modified during data transmission. MCS could be changed from packet to packet for transmission and since the MCS does not have any substantial impact on sensing and resource selection procedures, each packet MCS value can be independently modified. The same could be applicable to transmit power as well.

In general, the legacy sensing and resource reselection procedure can be flexible enough to ensure that UE can change radio-layer parameters on a per packet basis, i.e. between resource reselection cycles. However, if UEs frequently update parameters for every TB transmission, it can impose certain performance loss in terms of designed sensing and resource reselection procedure, which benefits should be preserved even in case of congestion. Therefore frequent change of parameters, especially increments/increase of amount of subchannels/TTIs/TX power could be avoided according to a determined frequency amount or other threshold, for example, also.

In an aspect, in case of congestion control, it can be beneficial to align timescale for an update of MCS/number of sub-channels/number of TTIs/Resource reservation interval/TX power with resource reselection time scale. Particularly, in order to reduce impact of congestion control on sensing procedure, it can be also important to restrict the amount of updates that a UE can perform within resource reselection cycle. For stable sensing performance, UEs can increase MCS, reduce number of occupied subchannels or TTIs, reduce power in order to avoid collisions with UEs performing resource reselection. However, increment of number of utilized subchannels, TTIs, TX power is not always desirable as discussed below.

For example, transmit power, in general, can be updated on a per packet basis. From the sensing and resource selection perspective, the reduced TX power should not cause significant damage to the system, if it is updated between resource reselection time instances; however, an increase of TX power could cause problems for reception of collided transmissions.

For example, MCS, in general, can be updated on a per packet basis to accommodate different packet sizes. It does not have an impact on sensing and resource selection procedure, and thus can be updated more frequently than other parameters.

For example, a number of occupied sub-channels, in general, can be updated on a per packet basis. From sensing and resource selection perspective, the reduced number of sub-channels should also not cause damage to the system, if it is updated (i.e. reduced) between resource reselection time instances. The increase of the number of occupied sub-channels can cause unnecessary resource collisions, for example.

For example, a number of TTIs, in general, can be updated on a per packet basis. From sensing and resource selection perspective, the reduced number of TTIs should also not cause damage to the system.

For example, a resource reservation interval, in general, should be updated at a resource reselection time scale in order to avoid impact on sensing and resource selection.

For congestion control, the amount of radio layer parameter updates within resource reselection cycle can be limited. For example, the limitation can be in an amount of attempts to increase/increment number of used TTIs, number of occupied sub-channels, as well as TX power that can be done within resource reselection cycle can be limited (pre-configured).

In another example, an amount of attempts to decrease/decrement number of used TTIs, number of occupied sub-channels, TX power that can be done within resource reselection cycle can be limited.

Because some parameters could be adjusted without any impact on resource reselection and sensing procedure, and some parameters have impact on resource reselection and sensing procedure some priorities could be introduced. As such, various priority of parameter adjustments can be introduced. Here, for example, in the UE 602 when CR_limit is achieved, the UE can follow a priority order: the UE certainly could change MCS, and then if it is not enough for a quality transmission level or reception then the UE can further change resource allocation. It can change/drop some transmission opportunities (TTIs), and then modify a resource reservation interval, for example. Afterwards, if occupancy ratio is still higher than CR_limits, the UE can drop the packets. So this is one of the options/embodiments which could be used to satisfy a CR_limit. The other option is packet dropping, as discussed above.

Additionally or alternatively, the CR_limit can be used to guide UE behavior during resource reselection procedure(s) and for the case of packet dropping at radio layers. In the following, CR_limit values can be tabulated (preconfigured) for each CBR range. In this case, the CR_limit can be used to adjust parameters during resource reselection and for packet dropping. During resource reselection, the UE can evaluate CBR and determine a CR_limit. The UE, for example, can adjust radio-layer transmission parameters in order to be compliant with limits sets by congestion control. Details on how the UE 602 can adjust these parameters can be left up to the UE implementation. However, it can be desirable to define pre-configured priorities for applying certain congestion control mechanisms, if several mechanisms are simultaneously configured. For example, the UE can be requested to perform MCS based control, and if it is not sufficient then sub-channelization and then number of TTIs and so on.

In one example, the eNB/gNB 111 or 112 can pre-configure a priority order for congestion control mechanisms. For example, a priority order can be as follows: MCS update>Sub-channelization update>Number of TTIs>Resource reservation interval update>Packet dropping.

Packet dropping, in particular, can be applied at the per packet level. In order to make a decision on Media Access Control (MAC) packet data unit (PDU) transmission, the UE 602, for example, can evaluate the CR_limit for packet. The packet drop ratio within given resource reselection interval can be pre-configured and controlled by the UE 602. The UE 602 could avoid dropping consecutive packets within the same resource reservation period. The maximum packet drop ratio can be also controlled by pre-configuration for each resource reservation interval and the UE not exceed that in case if there is a traffic congestion.

In an aspect, the CR_limit can be defined for each ProSe Per Packet Priority (PPPP). In particular, a solution can be provide for when the user transmits packets of different priorities where there could be low priority packets and high priority packets. In this case, low priority should not affect transmission of high priority packets. To solve this problem, a rule which the UE could follow to allow transmission of higher priority packets and also help to keep the target congestion level within defined limits should be defined.

For example, four priorities along with the estimate channel occupancy ratio for each of these priorities can be configured, each corresponding to an occupancy ratio limit, for example. Prior to each packet transmission, the UE 602 can check the following four rules, where for each specific packet transmission it could check that these rules are satisfied.

Higher priority packets should not be blocked in any means by transmission of lower priority packets, therefore the CR can be calculated for each PPPP value. Let's consider example when UEs transmit packets with different priority levels P1<P2<P3<P4. In this case, UEs should be able to estimate channel occupancy ratio $CR_{P1}$, $CR_{P2}$, $CR_{P3}$, $CR_{P4}$ for packets with different priority levels. In case of congestion control, high priority packets should not compete with lower priority packets. It means that even if channel occupancy ratio for low priority packets was utilized, it should not affect the UE decision to transmit the higher priority packet or select resource reservation interval based the high priority limit. This can be translated into the following rules: $CR_{P4}<CR_{P4}\_limit$; $CR_{P3}+CR_{P4}<CR_{P3}\_limit$; $CR_{P2}+CR_{P3}+CR_{P4}<CR_{P2}\_limit$; $CR_{P1}+CR_{P2}+CR_{P3}+CR_{P4}<CR_{P1}\_limit$. These rules can translate into the following UE behavior in terms of resource selection and actual transmissions: where $CR_{P4}<CR_{P4}\_limit$ provides that UE transmitting priority 4 packet should ensure this condition; $CR_{P3}+CR_{P4}<CR_{P3}\_limit$ provides that the UE transmitting priority 3 packet should ensure this condition; $CR_{P2}+CR_{P3}+$ $CR_{P4} < CR_{P2}\_limit$ provides that the UE transmitting priority 2 packet should ensure this condition; and $CR_{P1}+CR_{P2}+CR_{P3}+CR_{P4} < CR_{P1}$ limit provides that the UE transmitting priority 1 packet should ensure this condition.

In particular, the UE can estimate the channel occupancy ratio per PPPP for congestion control. The transmission of higher priority packets is not affected by transmission of low priority packets. The above rule can be used to prioritize transmission of packets with different priorities In other aspects, the UE 602 could be allowed to drop packets at radio layers in case of congestion. From a sensing and resource selection perspective the preferable way is to adjust resource reservation interval. On top of that UE can additionally drop limited number of packets if it does not cause resource reselection or the resource (re)selection window.

Figure 14:
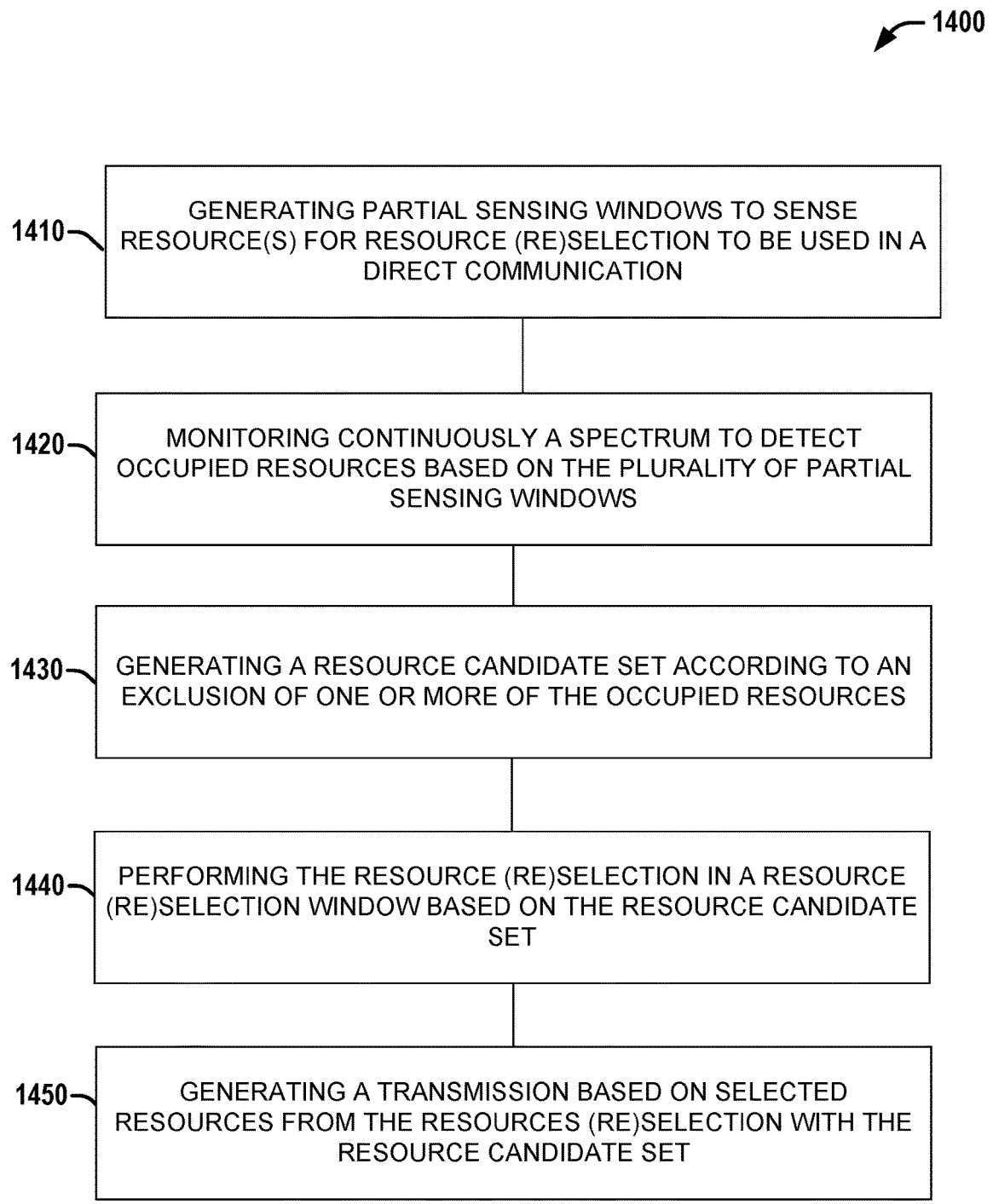
FIG. 14 a flow diagram of an example method employable at a UE that for P2V or V2P communications, according to various aspects described herein, according to various aspects discussed herein.

Referring to FIG. 14, illustrated is an example method 1400 for V2P or V2V communications. A processor of a P-UE or V-UE can generate one or more operations based on executable instructions. The operations of the process flow 1400 can initiate at 1410 with generating a plurality of partial sensing windows to sense one or more resources for a resource (re)selection to be used in a direct communication with another UE.

At 1420, the process flow 1400 further includes monitoring continuously a spectrum to detect occupied resources based on the plurality of partial sensing windows.

At 1430, the process flow 1400 further includes generating a resource candidate set according to an exclusion of one or more of the occupied resources.

At 1440, the process flow 1400 further includes performing the resource (re)selection in a resource (re)selection window based on the resource candidate set.

At 1450 generating a transmission based on selected resources from the resources (re)selection with the resource candidate set.

The operations can further include processing transmissions across the plurality of partial sensing windows by detecting reservation periods associated with the transmissions in the plurality of partial sensing windows and corresponding resources in the plurality of partial sensing windows; excluding the occupied resources within at least one of the reservation periods from the resource candidate set based on a table or dataset of resource reservation intervals corresponding to partial sensing window configuration values K; and processing the set of resource reservation intervals independently at each of the plurality of partial sensing windows.

Alternatively, or additionally, the operations include defining partial sensing window durations comprising different lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window by other UEs for a vehicle-to-pedestrian (V2P) communication.

The operations can also include determining for each resource in resource selection window an average sidelink (SL) received signal strength indication (SL-RSSI) measurement across resources of the plurality of partial sensing windows; ranking the non-excluded resources windows based on the SL-RSSI, respectively, to determine congestion levels of the candidate resource set for the resource (re) selection at the plurality of partial sensing windows; and generating the resource candidate set based on one or more of the non-excluded resources that satisfy a predetermined threshold.

In a first set of examples to the various aspects/embodiments herein, the below examples are envisioned further.

Example 1 is a method of partial sensing for resource selection to reduce UE power consumption and minimize impact on performance of sensing based resource selection for LTE V2V communication that comprises: Setting of configurable partial sensing windows; Partial sensing procedure; Resource selection procedure based on partial sensing.

Example 2 includes the subject matter of Example 1 or other examples herein, wherein, set of configurable partial sensing windows, where each partial sensing window comprises: UE-specific or cell-common (pre)-configuration of partial sensing window durations including maximum and minimum length; Time interval between partial sensing window and resource reselection time instance; Set of resource reservation intervals 'Prsvp_RX' associated with each partial sensing window that should be taken into account in resource exclusion step of resource reselection procedure.

Example 3 includes the subject matter of any one of Examples 1-2 or other examples herein, including any elements as optional, wherein, partial sensing and resource selection procedure provide independent processing for each partial sensing window projecting its transmissions to future/further resource selection windows; provide conditional processing for each partial sensing window and projecting it transmissions to future resource selection windows.

Example 4 includes the subject matter of any one of Examples 1-3 or other examples herein, including any elements as optional, wherein, partial sensing and resource selection procedure include sidelink (SL) received signal strength indication (SL-RSSI) measurement averaged across all partial sensing windows to characterize congestion level of candidate resource for selection.

Example 5 includes the subject matter of any one of Examples 1-4 or other examples herein, including any elements as optional, wherein, the possible set of P-UE resource reservation intervals is (pre)-configured by eNB (e.g. range or set of allowed resource reservation intervals); eNB can (pre)configure the set of partial windows to be sensed for each of P-UE resource reservation interval.

Example 6 includes the subject matter of any one of Examples 1-5 or other examples herein, wherein, the start time of resource (re)-selection window and corresponding partial sensing windows is left up to UE implementation (subject to latency budget constraint).

Example 7 includes the subject matter of any one of Examples 1-6 or other examples herein, wherein, in case of resource reselection triggering at P-UE, if previous partial sensing results are valid or partially valid, P-UE selects temporary resource for transmission in new resource (re)-selection window, by re-interpreting the set of partial windows. P-UE reselects temporary resource once new partial sensing data are available; if previous partial sensing results are outdated, P-UE randomly selects resource for transmission in new resource selection window, and (re)-selects resource based on partial sensing once partial sensing data are available for new resource reselection window.

Example 8 includes the subject matter of any one of Examples 1-7 or other examples herein, wherein, P-UE is allowed to skip partial sensing between consecutive resource reselections and wake up to perform partial sensing according to configuration of partial sensing windows before the next resource reselection; P-UE can be configured to perform partial sensing with respect to its own resource reservation time instances (resource selection windows).

Example 9 includes the subject matter of any one of Examples 1-8 or other examples herein, wherein, extend set of possible partial sensing window configurations K by additional ki elements [⅕, ½] on top of existing range [1, 10].

Example 10 includes the subject matter of any one of Examples 1-9 or other examples herein, perform a method of congestion control for V2V communication, wherein CR_limit is defined for each PPPP. The high priority packet transmission is not blocked in any means by lower priority packet transmission; wherein channel occupancy ratio CR is evaluated for each PPPP value. Let's consider example when UEs may transmit packets with different priority levels P1<P2<P3<P4; In this case, UE should be able to estimate channel occupancy ratio $CR_{P1}$, $CR_{P2}$, $CR_{P3}$, $CR_{P4}$ for packets with different priorities: $CR_{P4} < CR_{P4}\_limit$; $CR_{P3} + CR_{P4} < CR_{P3}\_limit$; $CR_{P2} + CR_{P3} + CR_{P4} < CR_{P2}\_limit$; $CR_{P1} + CR_{P2} + CR_{P3} + CR_{P4} < CR_{P1}\_limit$, where $CR_{P4} < CR_{P4}\_limit$–UE transmitting priority 4 packet should ensure the condition(s); $CR_{P3} + CR_{P4} < CR_{P3}\_limit$–UE transmitting priority 3 packet should ensure the condition(s); $CR_{P2} + CR_{P3} + CR_{P4} < CR_{P2}\_limit$–UE transmitting priority 2 packet should ensure the condition(s); $CR_{P1} + CR_{P2} + CR_{P3} + CR_{P4} < CR_{P1}\_limit$–UE transmitting priority 1 packet should ensure the condition(s).

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In a second set of examples to the various aspects/embodiments herein, the below examples are envisioned further.

Example 1 is an apparatus configured to be employed in a user equipment (UE) to support reduced complexity and power efficiency in a sidelink communication for pedestrian to vehicle (V2P) communication, comprising: processing circuitry configured to: generate a plurality of partial sensing windows to be sensed for a resource (re)selection procedure; monitor one or more physical channels to detect occupied resources based on the plurality of partial sensing windows; generate a candidate resource set based on non-occupied resources or less congested resources determined from processing the plurality of partial sensing windows; and perform the resource (re)selection in a resource (re)selection window based on a resource (re)selection trigger and the candidate resource set; and a radio frequency (RF) interface, configured to provide, to RF circuitry, data for the pedestrian to vehicle communication based on the resource (re)selection procedure.

Example 2 includes the subject matter of Example 1, wherein the processing circuitry is further configured to: process one or more transmissions at a partial sensing window of the plurality of partial sensing windows by detecting one or more occupied resources of the partial sensing window and excluding the one or more occupied resources from resource (re)selection window in response to an indicated resource reservation interval for a transmission within the partial sensing window pointing to one of the resources within the resource (re)selection window and a reference signal receive power (RSRP) measurement exceeding a predetermined threshold.

Example 3 includes the subject matter of any one of Examples 1-2, including or omitting any elements as optional, wherein the processing circuitry is further configured to process transmissions across the plurality of partial sensing windows by detecting different reservation intervals of the transmission within the plurality of partial sensing windows to construct the candidate resource set within the resource (re)selection window by processing the plurality of partial sensing windows when resource (re)selection is triggered based on a counter or other condition, so that resources corresponding to detected transmissions pointing directly to the resource (re)selection window are excluded from the candidate resource set while for remaining resources a sidelink received signal strength power (SL-RSSI) measurements are carried out.

Example 4 includes the subject matter of any one of Examples 1-3, including or omitting any elements as optional, wherein the processing circuitry is further configured to average SL-RSSI measurements for non-excluded candidate resources across the plurality of partial sensing windows for constructing the candidate resource set based on an average SL-RSSI to form a set of less congested resources.

Example 5 includes the subject matter of any one of Examples 1-4, including or omitting any elements as optional, wherein the processing circuitry is further configured to rank the non-excluded resources based on the average SL-RSSI measurements, respectively, to determine congestion levels of candidate resources of the candidate resource set within the resource (re)selection window at the plurality of partial sensing windows and construct the candidate resource set based on one or more of the non-excluded resources of the plurality of partial sensing windows.

Example 6 includes the subject matter of any one of Examples 1-5, including or omitting any elements as optional, the processing circuitry is further configured to randomly select a resource for the vehicle communication from the candidate resource set constructed based on the processing of the plurality of partial sensing windows.

Example 7 includes the subject matter of any one of Examples 1-6, including or omitting any elements as optional, wherein the processing circuitry is further configured to set partial sensing window durations comprising maximum lengths and minimum lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window.

Example 8 includes the subject matter of any one of Examples 1-7, including or omitting any elements as optional, wherein the processing circuitry is further configured to: process one or more reservation intervals based on a range of received resource reservation intervals, or a pre-configured set of partial sensing windows; and monitor a number of partial sensing windows based on a frequency of the one or more P-UE resource reservation intervals.

Example 9 includes the subject matter of any one of Examples 1-8, including or omitting any elements as optional, wherein the processing circuitry is further configured to: process a plurality of transmissions received inside of the partial sensing windows corresponding to the expected resource (re)selection window not being fully aligned with a duration of the resource (re)selection window used for resource (re)selection, and select for processing only the one or more resources that overlap or within the partial sensing windows corresponding to the resource (re)selection window used for resource (re)selection while performing the resource (re)selection to be used in a vehicle-to-pedestrian (V2P) communication; and process one or more transmissions received inside of the partial sensing windows corresponding to the expected resource (re)selection window not overlapped with a duration of the resource (re)selection window used for resource (re)selection, and selecting resource candidates from an expected partial sensing window to be used in the vehicle-to-pedestrian (V2P) communication.

Example 10 includes the subject matter of any one of Examples 1-9, including or omitting any elements as optional, wherein the processing circuitry is further configured to determine a temporary resource for the one or more transmissions in case when all of the plurality of partial sensing windows is not available by re-interpreting a set of partial sensing window configuration values K to a different set of partial sensing window configuration values K', and a random selection of the resource candidate within resource selection windows or within an exceptional resource pool configured to determine UE behavior in exceptional cases.

Example 11 includes the subject matter of any one of Examples 1-10, including or omitting any elements as optional, wherein the processing circuitry is further configured to reduce power consumption by skipping one or more partial sensing windows and sensing operations between subsequent time instances of one or more resource (re)selections and powering from a sleep mode in advance to process all of the plurality of partial sensing windows before a next resource (re)selection is triggered.

Example 12 includes the subject matter of any one of Examples 1-11, including or omitting any elements as optional, wherein the processing circuitry is further configured to scale a resource reselection counter by a factor of at least one of: 5 or 2, to enable processing of short transmission periods comprising at least one of: 20 ms or 50 ms for performing partial sensing, or extend a set of partial sensing window configuration values K by additional candidates [⅕, ½], wherein K comprises an integer from 1 to 10 and ⅕ and ½.

Example 13 includes the subject matter of any one of Examples 1-12, including or omitting any elements as optional, wherein the processing circuitry is further configured to: perform a congestion control process for a V2V communication, by defining a channel occupancy ratio limit (CR_limit) for a plurality of ProSe Per Packet Priority (PPPP) values, wherein in a higher priority packet transmission is not blocked by a lower priority packet transmission; configure transmissions with different priority levels P1<P2<P3<P4; estimate channel occupancy ratios $CR_{P1}$, $CR_{P2}$, $CR_{P3}$, $CR_{P4}$ for packets with different priorities based on conditions comprising: $CR_{P4}<CR_{P4}\_limit$ being UE transmitting priority 4 packet; $CR_{P3}+CR_{P4}<CR_{P3}\_limit$ being UE transmitting priority 3 packet; $CR_{P2}+CR_{P3}+CR_{P4}<CR_{P2}\_limit$ being UE transmitting priority 2 packet; and $CR_{P1}+CR_{P2}+CR_{P3}+CR_{P4}<CR_{P1}\_limit$ being UE transmitting priority 1 packet; drop one or more packet transmissions on one or more reserved resources in response to a dynamic transmission and the CR_limit not being satisfied or met with current resource reservation parameters; and trigger the resource (re)selection in response to a number of dropped transmission exceeding a predetermined threshold of dropped transmissions.

Example 14 is a computer readable storage medium storing executable instructions that, in response to execution, cause one or more processors of a user equipment to support reduced complexity and power efficiency in a sidelink communication for vehicle communication, the operations comprising: generating a plurality of partial sensing windows to be sensed for a resource (re)selection procedure; monitoring continuously one or more sidelink physical channels to detect occupied resources based on the plurality of partial sensing windows; generating a candidate resource set based on the one or more occupied resources or less congested resources over the plurality of partial sensing windows; performing the resource (re)selection procedure in a resource (re)selection window based on the candidate resource set; and generating a transmission based on selected resources from the resources (re)selection with the candidate resource set formed from a sensing procedure over the plurality of partial sensing windows.

Example 15 includes the subject matter of Example 14, wherein the operations further comprise: processing transmissions across the plurality of partial sensing windows by detecting the transmissions with various resource reservation intervals in the plurality of partial sensing windows and corresponding resources of the plurality of partial sensing windows to construct the candidate resource set within the resource (re)selection window; excluding the occupied resources within at least one of the different reservation intervals from the candidate resource set based on a table or a set of resource reservation intervals and a set of partial sensing window configuration values K.

Example 16 includes the subject matter of any one of Examples 14-15, including or omitting any elements as optional, wherein the operations further comprise: defining partial sensing window durations comprising different lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window by other UEs for a vehicle-to-pedestrian (V2P) communication.

Example 17 includes the subject matter of any one of Examples 14-16, including or omitting any elements as optional, wherein the operations further comprise: determining an average sidelink (SL) received signal strength indication (SL-RSSI) measurement across non-excluded resources of the plurality of partial sensing windows; ranking the non-excluded resources of the plurality of partial sensing windows based on the SL-RSSI, respectively, to determine congestion levels of the candidate resource set for the resource (re)selection procedure at the plurality of partial sensing windows; and generating the candidate resource set based on one or more of the non-excluded resources of the plurality of partial sensing windows that satisfy a predetermined threshold.

Example 18 includes the subject matter of any one of Examples 14-17, including or omitting any elements as optional, wherein the operations further comprise: configuring the plurality of partial sensing windows to be less than a predefined threshold number of subframes and a set of partial sensing window configuration values K.

Example 19 includes the subject matter of any one of Examples 14-18, including or omitting any elements as optional, wherein the operations further comprise: evaluating a defined number of partial sensing windows differently in response to a frequency of P-UE reservation intervals being different than another frequency of P-UE reservation intervals by increasing the defined number of partial sensing windows in response to an increase in frequency to enable the resource (re)selection procedure of short transmission period transmissions; or scaling a resource reselection counter by a factor to increase another resource (re)selection time of short transmission periods to correspond to a different (re)selection time corresponding to 100 ms transmission periods.

Example 20 includes the subject matter of any one of Examples 14-19, including or omitting any elements as optional, wherein the operations further comprise: processing a plurality of transmissions received partially inside of the resource (re)selection window in response to a duration of the partial sensing window not being aligned with a duration of the resource (re)selection window, and select only the one or more resources that overlap or within the partial sensing window while performing the resource (re)selection procedure to be used in a vehicle-to-pedestrian (V2P) communication; and processing one or more transmissions received entirely outside of the resource (re)selection window in response to the duration of the partial sensing window not overlapping with the duration of the resource (re)selection window, and selecting resource candidates from a prior partial sensing window selection to be used in the vehicle-to-pedestrian (V2P) communication.

Example 21 includes the subject matter of any one of Examples 14-20, including or omitting any elements as optional, wherein the operations further comprise: performing a congestion control process for a V2V communication, by defining an occupancy ratio (CR_limit) for a plurality of ProSe Per Packet Priority (PPPP) values, wherein in a higher priority packet transmission is not blocked by a lower priority packet transmission; configuring detected transmissions with different priority levels P1<P2<P3<P4; estimating channel occupancy ratios $CR_{P1}$, $CR_{P2}$, $CR_{P3}$, $CR_{P4}$ for packets with different priorities; and selecting the resource candidates of the candidate resource set based on the channel occupancy ratios and the different priorities.

Example 22 is an apparatus configured to be employed in a vehicle user equipment (V-UE) or a pedestrian user equipment (P-UE), comprising: a memory interface that can store any one or more of the below elements (e.g., candidate resource set); and processing circuitry configured to: determine one or more occupied resources on a plurality of channels in one or more partial sensing windows; generate a candidate resource set based on the one or more non-occupied resources; perform resource (re)selection procedure in a resource (re)selection window based on the candidate resource set; and generate a transmission based on selected resources from the resources (re)selection with the candidate resource set.

Example 23 includes the subject matter of Example 22, wherein the processing circuitry is further configured to: configure one or more radio layer parameters for a congestion control comprising a resource reservation interval for the transmission; and modify the resource reservation interval based on at least one of: different channel busy ratios (CBRs) for transmission or a packet dropping within a predefined threshold amount.

Example 24 includes the subject matter of any one of Examples 22-23, including or omitting any elements as optional, wherein the processing circuitry is further configured to: determine the CBRs or a channel occupancy limit for the one or more radio layer parameters based on one or more thresholds of a resource pools, excluding an exceptional resource pool; and (re)align a timescale to update the one or more radio layer parameters comprising a modulation and coding scheme (MCS), a number of sub-channels, a number of time transmission intervals (TTIs), a resource reservation interval, or a transmit power with a resource reselection time scale.

Example 25 includes the subject matter of any one of Examples 22-24, including or omitting any elements as optional, wherein the processing circuitry is further configured to: perform a congestion control process for a V2V communication, by defining an occupancy ratio (CR_limit) for a plurality of ProSe Per Packet Priority (PPPP) values, wherein in a higher priority packet transmission is not blocked by a lower priority packet transmission; configure detected transmissions with different priority levels P1<P2<P3<P4; estimate channel occupancy ratios $CR_{P1}$, $CR_{P2}$, $CR_{P3}$, $CR_{P4}$ for packets with different priorities; and select the resource candidates of the candidate resource set based on the channel occupancy ratios and the different priorities.

Example 26 is an apparatus employed in a user equipment to support reduced complexity and power efficiency in a sidelink communication for vehicle communication, comprising: means for generating a plurality of partial sensing windows to be sensed for a resource (re)selection procedure; means for monitoring continuously one or more sidelink physical channels to detect occupied resources based on the plurality of partial sensing windows; means for generating a candidate resource set based on the one or more occupied resources or less congested resources over the plurality of partial sensing windows; means for performing the resource (re)selection procedure in a resource (re)selection window based on the candidate resource set; and means for generating a transmission based on selected resources from the resources (re)selection with the candidate resource set formed from a sensing procedure over the plurality of partial sensing windows.

Example 27 includes the subject matter of Example 26, including or omitting any elements as optional, further comprising: means for processing transmissions across the plurality of partial sensing windows by detecting the transmissions with various resource reservation intervals in the plurality of partial sensing windows and corresponding resources of the plurality of partial sensing windows to construct the candidate resource set within the resource (re)selection window; means for excluding the occupied resources within at least one of the different reservation intervals from the candidate resource set based on a table or a set of resource reservation intervals and a set of partial sensing window configuration values K.

Example 28 includes the subject matter of Example 26, including or omitting any elements as optional, further comprising: means for defining partial sensing window durations comprising different lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window by other UEs for a vehicle-to-pedestrian (V2P) communication.

Example 29 includes the subject matter of any one of Examples 26-28, including or omitting any elements as optional, further comprising: means for determining an average sidelink (SL) received signal strength indication (SL-RSSI) measurement across non-excluded resources of the plurality of partial sensing windows; means for ranking the non-excluded resources of the plurality of partial sensing windows based on the SL-RSSI, respectively, to determine congestion levels of the candidate resource set for the resource (re)selection procedure at the plurality of partial sensing windows; and means for generating the candidate resource set based on one or more of the non-excluded resources of the plurality of partial sensing windows that satisfy a predetermined threshold.

Example 30 includes the subject matter of any one of Examples 26-29, including or omitting any elements as optional, further comprising: means for configuring the plurality of partial sensing windows to be less than a predefined threshold number of subframes and a set of partial sensing window configuration values K.

Example 31 includes the subject matter of any one of Examples 26-30, including or omitting any elements as optional, further comprising: means for evaluating a defined number of partial sensing windows differently in response to a frequency of P-UE reservation intervals being different than another frequency of P-UE reservation intervals by increasing the defined number of partial sensing windows in response to an increase in frequency to enable the resource (re)selection procedure of short transmission period transmissions; or means for scaling a resource reselection counter by a factor to increase another resource (re)selection time of short transmission periods to correspond to a different (re)selection time corresponding to 100 ms transmission periods.

Example 32 includes the subject matter of any one of Examples 26-31, including or omitting any elements as optional, further comprising: means for processing a plurality of transmissions received partially inside of the resource (re)selection window in response to a duration of the partial sensing window not being aligned with a duration of the resource (re)selection window, and select only the one or more resources that overlap or within the partial sensing window while performing the resource (re)selection procedure to be used in a vehicle-to-pedestrian (V2P) communication; and means for processing one or more transmissions received entirely outside of the resource (re)selection window in response to the duration of the partial sensing window not overlapping with the duration of the resource (re)selection window, and selecting resource candidates from a prior partial sensing window selection to be used in the vehicle-to-pedestrian (V2P) communication.

Example 32 includes the subject matter of any one of Examples 26-31, including or omitting any elements as optional, further comprising: means for performing a congestion control process for a V2V communication, by defining an occupancy ratio (CR_limit) for a plurality of ProSe Per Packet Priority (PPPP) values, wherein in a higher priority packet transmission is not blocked by a lower priority packet transmission; means for configuring detected transmissions with different priority levels P1<P2<P3<P4; means for estimating channel occupancy ratios $CR_{P1}$, $CR_{P2}$, $CR_{P3}$, $CR_{P4}$ for packets with different priorities; and means for selecting the resource candidates of the candidate resource set based on the channel occupancy ratios and the different priorities.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a user equipment (UE) to support reduced complexity and power efficiency in a sidelink communication for pedestrian to vehicle (V2P) communication, comprising:
   processing circuitry configured to:
      generate a plurality of partial sensing windows to be sensed for a resource (re)selection procedure;
      monitor one or more physical channels to detect occupied resources based on the plurality of partial sensing windows;
      generate a candidate resource set based on non-occupied resources or less congested resources determined from processing the plurality of partial sensing windows; and
      perform the resource (re)selection procedure in a resource (re)selection window based on a resource (re)selection trigger and the candidate resource set;
   wherein generating the plurality of partial sensing windows comprises:
      processing one or more sidelink control information (SCI) to determine resource reservations;
      excluding resources from the candidate resource set corresponding to the resource reservations with different resource reservation intervals in the plurality of partial sensing windows and based on priority dependent reference signal receive power (RSRP) thresholds; and
      measuring sidelink received signal strength power (SL-RSSI) measurements for remaining resources of the candidate resource set of the plurality of partial sensing windows; and a radio frequency (RF) interface, configured to provide, to RF circuitry, data for the pedestrian to vehicle communication based on the resource (re)selection procedure.

2. The apparatus of claim 1, wherein the processing circuitry is further configured to:
   process one or more transmissions at a partial sensing window of the plurality of partial sensing windows by detecting one or more occupied resources of the partial sensing window and excluding the one or more occupied resources from resource (re)selection window in response to an indicated resource reservation interval for a transmission within the partial sensing window pointing to one of the resources within the resource (re)selection window and a reference signal receive power (RSRP) measurement exceeding a predetermined threshold.

3. The apparatus of claim 1, wherein the processing circuitry is further configured to process the plurality of partial sensing windows when resource (re)selection is triggered based on a counter or other condition.

4. The apparatus of claim 2, wherein the processing circuitry is further configured to average SL-RSSI measurements for non-excluded candidate resources across the plurality of partial sensing windows for constructing the candidate resource set based on an average SL-RSSI to form a set of less congested resources.

5. The apparatus of claim 1, wherein the processing circuitry is further configured to rank non-excluded resources based on average SL-RSSI measurements, respectively, to determine congestion levels of candidate resources of the candidate resource set within the resource (re)selection window at the plurality of partial sensing windows and construct the candidate resource set based on one or more of the non-excluded resources of the plurality of partial sensing windows.

6. The apparatus of claim 5, the processing circuitry is further configured to randomly select a resource for the vehicle communication from the candidate resource set constructed based on the processing of the plurality of partial sensing windows.

7. The apparatus of claim 1, wherein the processing circuitry is further configured to set partial sensing window durations comprising maximum lengths and minimum lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window.

8. The apparatus of claim 7, wherein the processing circuitry is further configured to:
   process one or more reservation intervals based on a range of received resource reservation intervals, or a pre-configured set of partial sensing windows; and
   monitor a number of partial sensing windows based on a frequency of the one or more resource reservation intervals.

9. The apparatus of claim 1, wherein the processing circuitry is further configured to:
   process a plurality of transmissions received inside of the partial sensing windows corresponding to the resource (re)selection window not being fully aligned with a duration of the resource (re)selection window used for resource (re)selection, and select for processing only the one or more resources that overlap or within the partial sensing windows corresponding to the resource (re)selection window used for resource (re)selection while performing the resource (re)selection to be used in a vehicle-to-pedestrian (V2P) communication; and process one or more transmissions received inside of the partial sensing windows corresponding to the resource (re)selection window not overlapped with a duration of the resource (re)selection window used for resource (re)selection, and selecting resource candidates from an expected partial sensing window to be used in the V2P communication.

10. The apparatus of claim 1, wherein the processing circuitry is further configured to:

determine a temporary resource for one or more transmissions in case when all of the plurality of partial sensing windows is not available by re-interpreting a set of partial sensing window configuration values K to a different set of partial sensing window configuration values K', and a random selection of the candidate resource candidate within resource selection windows or within an exceptional resource pool configured to determine UE behavior in exceptional cases.

11. The apparatus of claim 1, wherein the processing circuitry is further configured to reduce power consumption by skipping one or more partial sensing windows and sensing operations between subsequent time instances of one or more resource (re)selections and powering from a sleep mode in advance to process all of the plurality of partial sensing windows before a next resource (re)selection is triggered.

12. The apparatus of claim 1, wherein the processing circuitry is further configured to scale a resource reselection counter by a factor of at least one of: 5 or 2, to enable processing of short transmission periods comprising at least one of: 20 ms or 50 ms for performing partial sensing, or extend a set of partial sensing window configuration values K by additional candidates [⅕, ½], wherein K comprises an integer from 1 to 10 and ⅕ and ½.

13. The apparatus of claim 1, wherein the processing circuitry is further configured to:

perform a congestion control process for a V2V communication, by defining a channel occupancy ratio limit (CR_limit) for a plurality of ProSe Per Packet Priority (PPPP) values, wherein in a higher priority packet transmission is not blocked by a lower priority packet transmission;

configure transmissions with different priority levels P1<P2<P3<P4;

estimate channel occupancy ratios $CR_{P1}$, $CR_{P2}$, $CR_{P3}$, $CR_{P4}$ for packets with different priorities based on conditions comprising: $CR_{P4}<CR_{P4}$_limit being UE transmitting priority 4 packet; $CR_{P3}+CR_{P4}<CR_{P3}$_limit being UE transmitting priority 3 packet; $CR_{P2}+CR_{P3}+CR_{P4}<CR_{P2}$_limit being UE transmitting priority 2 packet; and $CR_{P1}+CR_{P2}+CR_{P3}+CR_{P4}<CR_{P1}$_limit being UE transmitting priority 1 packet;

drop one or more packet transmissions on one or more reserved resources in response to a dynamic transmission and the CR_limit not being satisfied or met with current resource reservation parameters; and trigger the resource (re)selection in response to a number of dropped transmission exceeding a predetermined threshold of dropped transmissions.

14. A non-transitory computer readable storage medium storing executable instructions that, in response to execution, cause one or more processors of a user equipment to perform operations that support reduced complexity and power efficiency in a sidelink communication for vehicle communication, the operations comprising:

generating a plurality of partial sensing windows to be sensed for a resource (re)selection procedure;

monitoring continuously one or more sidelink physical channels to detect occupied resources based on the plurality of partial sensing windows;

generating a candidate resource set based on the occupied resources or less congested resources over the plurality of partial sensing windows;

performing the resource (re)selection procedure in a resource (re)selection window based on the candidate resource set;

generating a transmission based on selected resources from the resources (re)selection with the candidate resource set formed from a sensing procedure over the plurality of partial sensing windows; and processing transmissions across the plurality of partial sensing windows by detecting the transmissions with different resource reservation intervals in the plurality of partial sensing windows and corresponding resources of the plurality of partial sensing windows to construct the candidate resource set within the resource (re)selection window;

excluding the occupied resources within at least one of the different reservation intervals from the candidate resource set based on a table or a set of resource reservation intervals and a set of partial sensing window configuration values.

15. The non-transitory computer readable storage medium of claim 14, wherein the operations further comprise:

defining partial sensing window durations comprising different lengths of the plurality of partial sensing windows based on a UE specific pre-configuration or a cell-common pre-configuration, a time interval between a partial sensing window of the plurality of partial sensing windows and a resource reselection time instance, and one or more resource reservation intervals of the plurality of partial sensing windows for an exclusion of the occupied resources in the resource (re)selection window by other UEs for a vehicle-to-pedestrian (V2P) communication.

16. The non-transitory computer readable storage medium of claim 14, wherein the operations further comprise:

determining an average sidelink (SL) received signal strength indication (SL-RSSI) measurement across non-excluded resources of the plurality of partial sensing windows;

ranking the non-excluded resources of the plurality of partial sensing windows based on the average SL-RSSI, respectively, to determine congestion levels of the candidate resource set for the resource (re)selection procedure at the plurality of partial sensing windows; and generating the candidate resource set based on one or more of the non-excluded resources of the plurality of partial sensing windows that satisfy a predetermined threshold.

17. The non-transitory computer readable storage medium of claim 14, wherein the operations further comprise:
configuring the plurality of partial sensing windows to be less than a predefined threshold number of subframes and a set of partial sensing window configuration values K.

18. The non-transitory computer readable storage medium of claim 14, wherein the operations further comprise:
evaluating a defined number of partial sensing windows differently in response to a frequency of P-UE reservation intervals being different than another frequency of P-UE reservation intervals by increasing the defined number of partial sensing windows in response to an increase in frequency to enable the resource (re)selection procedure of short transmission period transmissions; or
scaling a resource reselection counter by a factor to increase another resource (re)selection time of short transmission periods to correspond to a different (re)selection time corresponding to 100 ms transmission periods.

19. The non-transitory computer readable storage medium of claim 14, wherein the operations further comprise:
processing a plurality of transmissions received partially inside of the resource (re)selection window in response to a duration of the partial sensing window not being aligned with a duration of the resource (re)selection window, and select only the one or more resources that overlap or within the partial sensing window while performing the resource (re)selection procedure to be used in a vehicle-to-pedestrian (V2P) communication; and
processing one or more transmissions received entirely outside of the resource (re)selection window in response to the duration of the partial sensing window not overlapping with the duration of the resource (re)selection window, and selecting resource candidates from a prior partial sensing window selection to be used in the vehicle-to-pedestrian (V2P) communication.

20. The non-transitory computer readable storage medium of claim 14, wherein the operations further comprise:
performing a congestion control process for a V2V communication, by defining an occupancy ratio (CR_limit) for a plurality of ProSe Per Packet Priority (PPPP) values, wherein in a higher priority packet transmission is not blocked by a lower priority packet transmission;
configuring detected transmissions with different priority levels P1<P2<P3<P4;
estimating channel occupancy ratios $CR_{P1}$, $CR_{P2}$, $CR_{P3}$, $CR_{P4}$ for packets with different priorities; and
selecting the resource candidates of the candidate resource set based on the channel occupancy ratios and the different priorities.

21. An apparatus configured to be employed in a vehicle user equipment (V-UE) or a pedestrian user equipment (P-UE), comprising:
a memory interface storing a candidate resource set; and
processing circuitry configured to:
determine one or more occupied resources on a plurality of channels in one or more partial sensing windows;
generate the candidate resource set based on non-occupied resources;
perform resource (re)selection procedure in a resource (re)selection window based on the candidate resource set;
configure one or more radio layer parameters for a congestion control comprising a resource reservation interval for a transmission;
modify the resource reservation interval based on at least one of: different channel busy ratios (CBRs) for the transmission, a channel occupancy ratio (CR) limit or a packet dropping within a predefined threshold amount; and
generate the transmission based on selected resources from the resources (re)selection with the candidate resource set.

22. The apparatus of claim 21, wherein the processing circuitry is further configured to:
determine the CBRs or the CR_limit for the one or more radio layer parameters based on one or more thresholds of a resource pools, excluding an exceptional resource pool; and
(re)align a timescale to update the one or more radio layer parameters comprising a modulation and coding scheme (MCS), a number of sub-channels, a number of time transmission intervals (TTIs), a resource reservation interval, or a transmit power with a resource reselection time scale.

23. The apparatus of claim 21, wherein the processing circuitry is further configured to:
perform a congestion control process for a V2V communication, by defining the channel occupancy ratio (CR_limit) for a plurality of ProSe Per Packet Priority (PPPP) values, wherein in a higher priority packet transmission is not blocked by a lower priority packet transmission;
configure detected transmissions with different priority levels P1<P2<P3<P4; estimate channel occupancy ratios $CR_{P1}$, $CR_{P2}$, $CR_{P3}$, $CR_{P4}$ for packets with different priorities; and
select the resource candidates of the candidate resource set based on the channel occupancy ratios and the different priorities.

\* \* \* \* \*